(12) United States Patent
Zhong et al.

(10) Patent No.: US 12,175,056 B2
(45) Date of Patent: Dec. 24, 2024

(54) PAGE SWITCHING METHOD AND APPARATUS, AND STORAGE MEDIUM

(71) Applicant: TENCENT TECHNOLOGY (SHENZHEN) COMPANY LIMITED, Shenzhen (CN)

(72) Inventors: Qinghua Zhong, Shenzhen (CN); Wei Yan, Shenzhen (CN); Fen He, Shenzhen (CN); Rong Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 175 days.

(21) Appl. No.: 17/016,351

(22) Filed: Sep. 9, 2020

(65) Prior Publication Data

US 2020/0409518 A1    Dec. 31, 2020

Related U.S. Application Data

(63) Continuation of application No. PCT/CN2019/102627, filed on Aug. 26, 2019.

(30) Foreign Application Priority Data

Aug. 29, 2018   (CN) .......................... 201810997033.6

(51) Int. Cl.
*G06F 3/0483* (2013.01)
*G06F 3/04847* (2022.01)
(Continued)

(52) U.S. Cl.
CPC ........ *G06F 3/0483* (2013.01); *G06F 3/04847* (2013.01); *G06F 3/0486* (2013.01); *G06F 3/04883* (2013.01)

(58) Field of Classification Search
CPC .............. G06F 3/0483; G06F 3/04847; G06F 3/04883; G06F 3/0486; G06F 3/0482;
(Continued)

(56) References Cited

U.S. PATENT DOCUMENTS 8,345,017 B1 * 1/2013 Cho ..................... G06F 3/04886
345/173
8,978,047 B2 * 3/2015 Hill ......................... G06F 9/445
719/318
(Continued)

FOREIGN PATENT DOCUMENTS

CN    103177021 A    6/2013
CN    106527874 A    3/2017
(Continued)

OTHER PUBLICATIONS

The World Intellectual Property Organization (WIPO) International Search Report for PCT/CN2019/102627 Nov. 28, 2019 5 Pages (including translation).
(Continued)

*Primary Examiner* — Daniel W Parcher
(74) *Attorney, Agent, or Firm* — ANOVA LAW GROUP, PLLC

(57) ABSTRACT

A page switching method performed by a page switching apparatus includes: displaying a second page and creating a first display control in response to a first trigger operation on a first page; displaying the first display control at an upper layer of the second page; displaying the first page and creating a second display control in response to a selection operation on the first display control displayed at the upper layer of the second page; and displaying the second display control at an upper layer of the first page. The first display (Continued)

control is configured to provide an entry to the first page; and the second display control is configured to provide an entry to the second page.

18 Claims, 14 Drawing Sheets

(51) Int. Cl.
*G06F 3/0486* (2013.01)
*G06F 3/04883* (2022.01)

(58) Field of Classification Search
CPC .. G06F 3/04886; G06F 3/147; G06F 3/04817; G06F 2203/04804; G06F 3/0481; G06F 3/0488; G06F 3/0484; G06F 9/451; G06F 2203/04806; G06F 3/04842; G06F 2203/04803; G06F 3/04845; H04N 21/4316; H04N 5/45; H04M 1/72403; H04M 2250/22
See application file for complete search history.

(56) References Cited

U.S. PATENT DOCUMENTS

| | | | |
|---|---|---|---|
| 9,052,820 B2* | 6/2015 | Jarrett | G06F 3/017 |
| 9,378,588 B2* | 6/2016 | Song | G06F 3/04815 |
| 9,483,160 B2* | 11/2016 | Jung | G06F 3/04817 |
| 9,720,557 B2* | 8/2017 | Steinbach | G06F 3/0481 |
| 10,579,218 B2* | 3/2020 | Lee | G06F 3/0481 |
| 10,990,237 B2 | 4/2021 | Kim et al. | |
| 11,314,388 B2* | 4/2022 | Yu | G06F 3/0488 |
| 2004/0183824 A1* | 9/2004 | Benson | G06F 9/451 |
| | | | 715/767 |
| 2005/0034056 A1* | 2/2005 | Rubin | G06F 16/958 |
| | | | 715/206 |
| 2006/0184895 A1* | 8/2006 | Dolph | G06F 9/451 |
| | | | 715/790 |
| 2007/0101289 A1* | 5/2007 | Awada | G06F 3/04855 |
| | | | 715/788 |
| 2007/0250787 A1* | 10/2007 | Kawahara | G06F 9/451 |
| | | | 715/782 |
| 2008/0134295 A1* | 6/2008 | Bailey | G06F 21/30 |
| | | | 726/4 |
| 2009/0113330 A1* | 4/2009 | Garrison | G06F 3/0486 |
| | | | 715/769 |
| 2010/0041457 A1* | 2/2010 | Cook | A63F 13/335 |
| | | | 463/16 |
| 2010/0115451 A1* | 5/2010 | Moore | G06F 16/957 |
| | | | 715/777 |
| 2010/0302172 A1* | 12/2010 | Wilairat | G06F 3/04883 |
| | | | 345/173 |
| 2011/0087981 A1* | 4/2011 | Jeong | G06F 3/0486 |
| | | | 715/765 |
| 2011/0175930 A1* | 7/2011 | Hwang | G06F 3/04886 |
| | | | 345/660 |
| 2012/0011453 A1* | 1/2012 | Shimono | H04L 51/10 |
| | | | 715/753 |
| 2012/0042272 A1 | 2/2012 | Hong et al. | |
| 2012/0054674 A1* | 3/2012 | Beykpour | G06F 3/0481 |
| | | | 715/788 |
| 2012/0225693 A1* | 9/2012 | Sirpal | G06F 3/04883 |
| | | | 455/566 |
| 2013/0021266 A1* | 1/2013 | Selim | G06F 3/0487 |
| | | | 345/173 |
| 2013/0145290 A1* | 6/2013 | Weber | G06F 3/0483 |
| | | | 715/760 |
| 2013/0227419 A1* | 8/2013 | Lee | G06F 9/48 |
| | | | 715/728 |
| 2013/0227472 A1* | 8/2013 | Sosinski | G06F 3/03547 |
| | | | 715/788 |
| 2014/0096055 A1* | 4/2014 | Jung | G06F 3/04855 |
| | | | 715/781 |
| 2014/0229888 A1* | 8/2014 | Ko | G06F 3/04842 |
| | | | 715/783 |
| 2015/0082189 A1* | 3/2015 | Baer | G06F 3/04817 |
| | | | 715/752 |
| 2015/0148106 A1* | 5/2015 | Choi | G06F 3/0488 |
| | | | 455/566 |
| 2015/0185980 A1* | 7/2015 | An | G06F 3/04817 |
| | | | 715/803 |
| 2015/0199093 A1* | 7/2015 | Kuscher | G06F 3/0486 |
| | | | 715/788 |
| 2015/0205448 A1* | 7/2015 | Clement | G06F 3/0482 |
| | | | 715/798 |
| 2015/0205456 A1* | 7/2015 | Ji | G06F 3/0481 |
| | | | 715/847 |
| 2015/0338888 A1* | 11/2015 | Kim | G06F 1/1643 |
| | | | 345/156 |
| 2015/0363066 A1* | 12/2015 | Lemay | G06F 3/04817 |
| | | | 345/173 |
| 2016/0085878 A1* | 3/2016 | Kang | G06F 16/954 |
| | | | 715/201 |
| 2016/0154536 A1* | 6/2016 | Kim | G06F 9/451 |
| | | | 715/768 |
| 2016/0342319 A1 | 11/2016 | Wang et al. | |
| 2017/0123621 A1* | 5/2017 | Louch | G06F 3/0488 |
| 2017/0308861 A1* | 10/2017 | Zhang | H04L 51/066 |
| 2018/0046341 A1* | 2/2018 | Lee | G06F 3/04842 |
| 2018/0284892 A1* | 10/2018 | Kwon | G06F 3/0416 |
| 2018/0300036 A1* | 10/2018 | Bhatt | G11B 27/031 |
| 2018/0329550 A1* | 11/2018 | Dellinger | G06F 3/0412 |
| 2019/0042066 A1* | 2/2019 | Kim | G06F 3/1446 |
| 2019/0138323 A1* | 5/2019 | Chiarella | G06F 9/542 |
| 2019/0278431 A1* | 9/2019 | Dunning | G06F 11/3003 |
| 2019/0346985 A1* | 11/2019 | Roard | G06F 3/0486 |
| 2020/0117325 A1* | 4/2020 | VanBlon | G06F 3/0482 |

FOREIGN PATENT DOCUMENTS

| | | |
|---|---|---|
| CN | 106648350 A | 5/2017 |
| CN | 106951148 A | 7/2017 |
| CN | 107368361 A | 11/2017 |
| CN | 107390986 A | 11/2017 |
| CN | 108241633 A | 7/2018 |
| EP | 2418572 A2 | 2/2012 |
| EP | 3001294 A2 | 3/2016 |
| KR | 20150015655 A | 2/2015 |
| KR | 20150135060 A | 12/2015 |
| KR | 20160020739 A | 2/2016 |
| WO | WO2016180260 A1 * | 4/2016 ........... G06F 3/0483 |

OTHER PUBLICATIONS

The State Intellectual Property Office of the People's Republic of China (SIPO) Office Action 1 for for 201810997033.6 Jul. 14, 2021 12 Pages (including translation).
Korean Intellectual Property Office (KIPO) Office Action 1 for 10-2020-7027790 Mar. 22, 2022 12 Pages (including translation).
The European Patent Office (EPO) The Extended European Search Report for 19856029.4 Dec. 21, 2023 13 Pages.

* cited by examiner

PAGE SWITCHING METHOD AND APPARATUS, AND STORAGE MEDIUM

CROSS-REFERENCES TO RELATED APPLICATIONS

This application is a continuation application of PCT Patent Application No. PCT/CN2019/102627, filed on Aug. 26, 2019, which claims priority to Chinese Patent Application No. 201810997033.6, filed on Aug. 29, 2018 and entitled "PAGE SWITCHING METHOD AND APPARATUS, STORAGE MEDIUM, AND COMPUTER DEVICE", the entire contents of both of which are incorporated herein by reference.

FIELD OF THE TECHNOLOGY

The present disclosure relates to the field of computer technologies, and in particular, to a page switching method and apparatus, a storage medium, and a computer device.

BACKGROUND OF THE DISCLOSURE

As application programs have more functions, the application programs include more user interfaces (UIs), and a switching path between UIs becomes longer and involves more steps or user operations. For example, an application program includes UIs A, B, C and D. A switch from the UI A to the UI D needs to be performed sequentially through the UIs B and C. A switch from the UI D to the UI A needs to be performed sequentially through the UIs C and B.

In this case, if a user currently browsing the UI A needs to browse the UI D, the user needs to sequentially switch from the UI A to the UI B, then from the UI B to the UI C, and finally from the UI C to the UI D. Subsequently, if the user needs to switch from the UI D back to the UI A, the user further needs to sequentially switch from the UI D to the UI C, then from the UI C to the UI B, and finally from the UI B to the UI A. Such a page switching manner is inconvenient.

SUMMARY

Based on this, it is necessary to provide a page switching method and apparatus, a storage medium, and a computer device, to resolve the technical problem of inconvenience of page switching in the related art.

Embodiments of the present disclosure provide a page switching method performed by a computing device such as a page switching apparatus, including: displaying a second page and creating a first display control in response to a first trigger operation on a first page; displaying the first display control at an upper layer of the second page; displaying the first page and creating a second display control in response to a selection operation on the first display control displayed at the upper layer of the second page; and displaying the second display control at an upper layer of the first page. The first display control is configured to provide an entry to the first page; and the second display control is configured to provide an entry to the second page.

The embodiments of the present disclosure provide a page switching apparatus, including: a memory and a processor coupled to the memory. The processor is configured to: display a second page and create a first display control in response to a first trigger operation on a first page; display the first display control at an upper layer of the second page; display the first page and create a second display control in response to a selection operation on the first display control displayed at the upper layer of the second page; and display the second display control at an upper layer of the first pa. The first display control is configured to provide an entry to the first page; and the second display control is configured to provide an entry to the second page.

The embodiments of the present disclosure provide a non-transitory computer-readable storage medium, storing a computer program, the computer program, when executed by a processor, cause the processor to perform: displaying a second page and creating a first display control in response to a first trigger operation on a first page; displaying the first display control at an upper layer of the second page; displaying the first page and creating a second display control in response to a selection operation on the first display control displayed at the upper layer of the second page; and displaying the second display control at an upper layer of the first page. The first display control is configured to provide an entry to the first page; and the second display control is configured to provide an entry to the second page.

BRIEF DESCRIPTION OF THE DRAWINGS

To describe the technical solutions in the embodiments of the present disclosure more clearly, the following briefly describes the accompanying drawings required for describing the embodiments. Obviously, the accompanying drawings in the following descriptions are merely some embodiments of the present disclosure, and a person of ordinary skill in the art may further obtain other accompanying drawings according to the accompanying drawings without creative efforts.

DESCRIPTION OF EMBODIMENTS

To make the objectives, technical solutions, and advantages of the present disclosure clearer and more comprehensible, the following further describes the present disclosure in detail with reference to the accompanying drawings and the embodiments. It is to be understood that the specific embodiments described herein are only used for describing the present disclosure, but are not intended to limit the present disclosure.

Terms such as "first" and "second" used in the present disclosure are used for distinguishing similar objects in naming, but these objects are not limited to these terms. It is to be understood that these terms can be exchanged in proper cases without departing from the scope of the present disclosure. For example, a "first display control" may be described as a "second display control", and similarly, a "second display control" may be described as a "first display control".

In addition, terms such as "including", "comprising", "having", and any other variant thereof are intended to cover a non-exclusive inclusion. For example, processes, methods, systems, products, or devices that include a series of steps or units are not limited to the steps or the units that are clearly listed, and may further include other steps and units that are not clearly listed or that are essential for the processes, methods, products, or devices.

Figure 1:
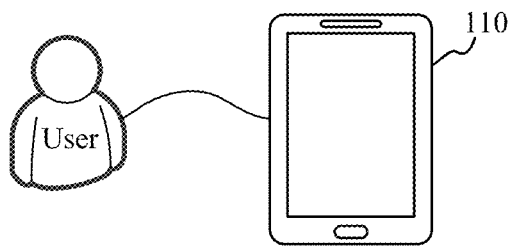
FIG. 1 is a diagram of an application environment of a page switching method according to an embodiment.

A page switching method provided in the embodiments of the present disclosure may be applied to an application environment shown in FIG. 1. The application environment may include a terminal 110. In a possible implementation, a first page may be displayed on a display screen of the terminal 110, and after a user performs a first trigger operation on the first page, the terminal 110 displays a second page and displays a first display control above the second page in response to the first trigger operation, the first display control being configured to provide an entry to the first page. Subsequently, after the user performs a selection operation on the first display control displayed above the second page, the terminal 110 displays the first page and displays a second display control above the first page in response to the selection operation, the second display control being configured to provide an entry to the second page. Presenting or displaying a display control above a certain page, as used herein, may refer to displaying the display control at an upper/top layer of the page. The upper layer of the page may be a floating layer.

The terminal 110 may be, but is not limited to, a smartphone, a tablet computer, a laptop computer, a desktop computer, a personal digital assistant, a wearable device, or the like.

Figure 2:
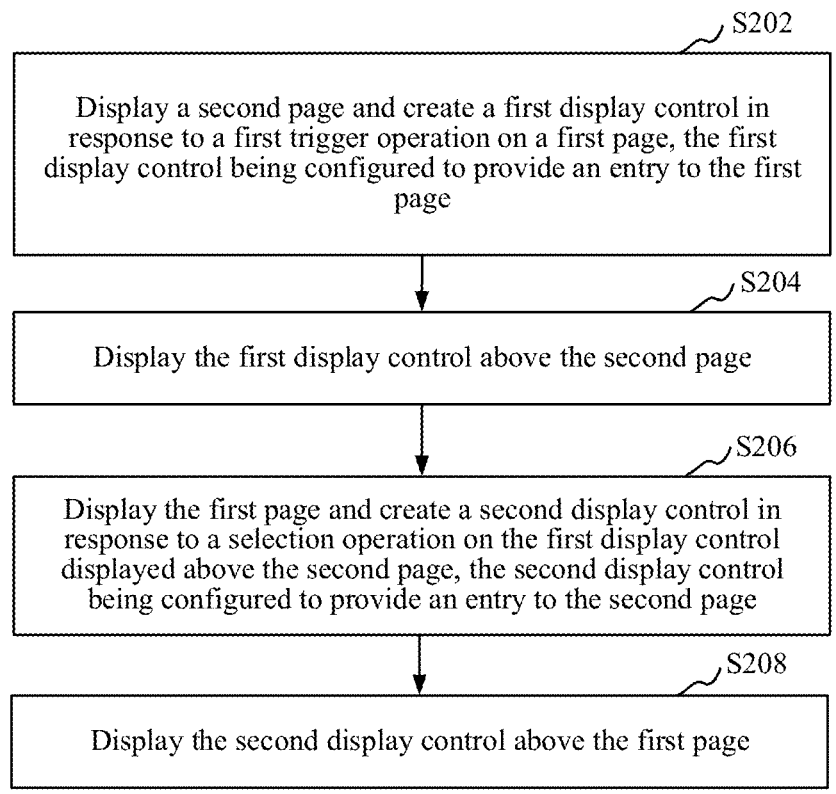
FIG. 2 is a schematic flowchart of a page switching method according to an embodiment.

In an embodiment, as shown in FIG. 2, a page switching method is provided. Description is made by using an example in which the method is applied to a computer device (for example, the terminal 110 in FIG. 1). The method may include the following steps S202 to S208.

S202: Display a second page and create a first display control in response to a first trigger operation on a first page, the first display control being configured to provide an entry to the first page.

Optionally, the terminal receives the first trigger operation on the first page, and displays the second page and creates the first display control according to the first trigger operation.

Figure 3A:
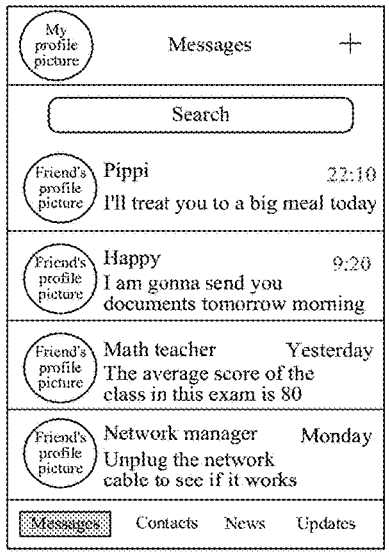
FIG. 3A-3E are schematic diagrams of UIs of a QQ application according to some embodiments.
Figure 3B:
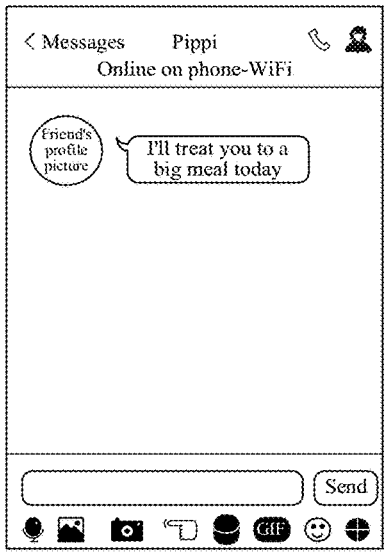
Figure 3C:
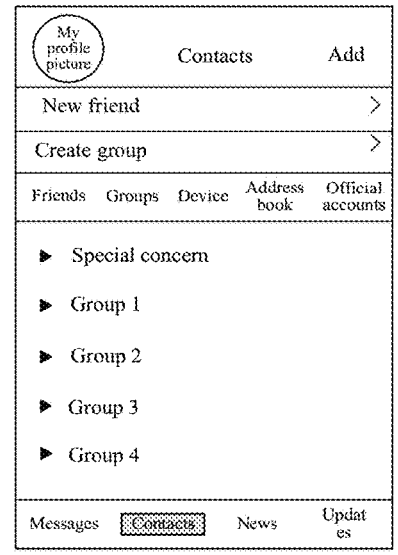
Figure 3D:
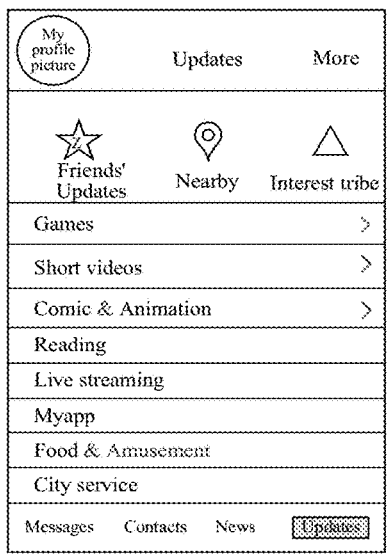
Figure 3E:
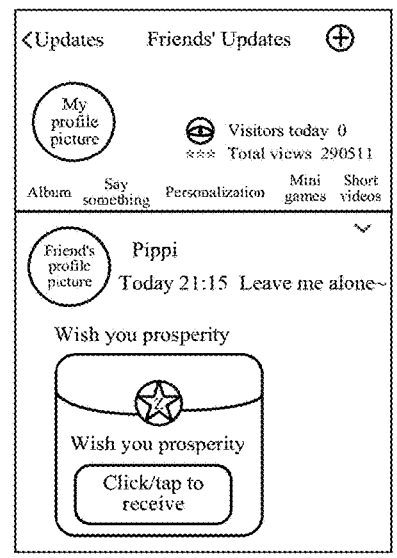

The first page is a UI in an application program. For example, for a QQ application, the first page may be any UI in the QQ application, such as a message list page shown in FIG. 3A, a message page of a conversation with a friend shown in FIG. 3B, a contact list page shown in FIG. 3C, a social network service (SNS) management page shown in FIG. 3D, or a friend's feed page of Qzone (e.g., a SNS page showing updates and feeds of the user and/or friends) shown in FIG. 3E. It is to be understood that the QQ application is only an example for description, and is not intended to limit application programs to which the method may be applied. For example, the method may be applied to a video play application, a travel application, a food delivery application, and other application programs involving page switching. The second page is similar to the first page, and a specific description of the second page may be the same as the description of the first page. Details are not described herein again.

In addition, the second page and the first page may be two different UIs in the same application program, that is, the second page and the first page are used for implementing different tasks. For example, for the QQ application, the first page is the message page of a conversation with a friend, and the second page is the message list page.

The first trigger operation may be used for triggering the terminal to switch between pages displayed in full screen and create a display control, the display control being configured to provide an entry to a page displayed before the switch. For example, the first trigger operation on the first page is used for triggering the terminal to switch from displaying the first page in full screen to displaying the second page in full screen, and create the display control configured to provide an entry to the first page.

The first trigger operation may be a predetermined operation that is performed by a user on a terminal displaying a UI of an application program. A specific form of the first trigger operation may be set according to an actual requirement providing that the form does not conflict with other functions of the application program. For example, the first trigger operation may be any one of the following three types:

A first type is a touch control operation, that is, an operation of touching the display screen of the terminal and performing a preset gesture operation on the display screen, for example, sliding to the left from a right edge of the display screen with a sliding distance reaching a predetermined distance, or drawing a predetermined pattern (such as an "M"-shaped pattern) on the display screen. A second type is a speech control operation, that is, an operation of outputting a predetermined speech to the terminal displaying the UI of the application program. For example, a user makes a speech "zoom out the page" to a mobile phone displaying the Qzone feeds page of the QQ application. A third type is an action control operation, that is, an operation of controlling the terminal to perform a predetermined motion, for example, shaking the terminal. When detecting that a quantity of pixels on a path of the sliding exceeds N, the terminal may determine that the sliding distance reaches the predetermined distance, N matching the predetermined distance.

The display control may be configured to provide an entry to a UI. That is, the terminal may be triggered, by operating the display control, to display a UI corresponding to the display control in full screen. The display control essentially may be an object such as an icon button or a view window with which a user may interact to input or operate data. Correspondingly, the first display control is a display control corresponding to the first page, and may be configured to provide an entry to the first page.

In a possible implementation, the display control is an interface thumbnail of a corresponding UI.

In addition, the display control may be displayed above the UI. That is, a display layer of the display control may be above a display layer of the UI, and visually, the display control floats on the UI. In an embodiment, when the display control is displayed above the UI, an area of the display control is smaller than an area of the UI, and an outer border of the display control does not extend beyond the UI.

S204: Display the first display control above the second page.

Figure 4:
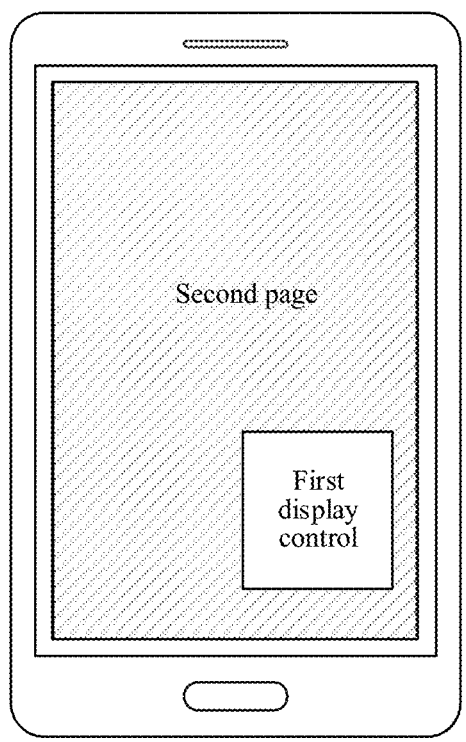
FIG. 4 is a schematic diagram of an interface of a first display control displayed above a second page according to an embodiment.

In one embodiment, after the first display control is created in response to the first trigger operation on the first page, the first display control may be displayed above the second page. It can be learned from the foregoing description that, a display layer of the first display control is above that of the second page. Visually, as shown in FIG. 4, the first display control is displayed floating on the second page. In addition, an area of the first display control is smaller than an area of the second page, and an outer border of the first display control does not extend beyond the second page.

Visually, when the first display control is completely opaque, a user can see the first display control and a part that is in the first page and that is not covered by the first display control; when the first display control is semi-transparent, the user can see a part that is in the first page and that is not covered by the first display control, and the first display control and a part that is in the first page and that overlaps with the first display control, both presented according to a transparency degree; and when the first display control is completely transparent, the user can see the entire first page, but cannot see the first display control.

In an embodiment, after the display control is displayed above the UI, the application program can support a user in changing an attribute such as a size, a transparency degree, or a color of the display control according to an actual requirement. For example, after the first display control is displayed above the second page, the application program can support the user in changing a size, a transparency degree, a color, or the like of the first display control according to an actual requirement. Certainly, the application program may alternatively not support the user in changing the attribute of the display control according to a product requirement.

In one embodiment, when displaying the first page, the terminal monitors an operation on the first page in real time, and when detecting the first trigger operation on the first page, the terminal switches from displaying the first page in full screen to displaying the second page in full screen, creates the first display control, and displays the first display control above the second page. Specific program logic of switching between pages displayed in full screen, creating a display control, and displaying the display control above a UI may be implemented in any proper manner, which is not specifically limited in the present disclosure. In an embodiment, a monitoring manner may adopt global monitoring.

In an embodiment, when switching from displaying the first page in full screen to displaying the second page in full screen, and displaying the first display control above the second page, the terminal may present an effect of gradually reducing the first page to the first display control.

In a possible implementation, when a trigger operation on a page element (which is not the first display control) in the second page is received, and the second page is switched to another page in the application program according to the trigger operation, the first display control is still displayed above the switch-to another page.

S206: Display the first page and create a second display control in response to a selection operation on the first display control displayed above the second page, the second display control being configured to provide an entry to the second page.

Optionally, the terminal receives the selection operation on the first display control, and displays the first page and creates the second display control according to the selection operation.

A selection operation may be used for triggering the terminal to switch a page displayed in full screen to a page corresponding to a display control on which the operation acts, and display, above the switched-to page, a display control corresponding to a page displayed before the switch. For example, the selection operation on the first display control displayed above the second page is used for triggering the terminal to switch from displaying the second page in full screen to displaying the first page in full screen, and display the display control corresponding to the second page above the first page.

The selection operation may be a predetermined operation performed by a user on a display control displayed above a UI. A specific form of the selection operation may be set according to an actual requirement providing that the form does not conflict with other functions of the application program. For example, the selection operation may be a click/tap operation on the display control (that is, clicking/tapping the display control), a press operation on the display control (that is, pressing the display control), or the like.

The second display control is a display control corresponding to the second page, and may be configured to provide an entry to the second page. That is, the terminal may be triggered, by operating the second display control, to display the second page in full screen.

In one embodiment, when displaying the second page and displaying the first display control above the second page, the terminal monitors an operation on the first display control in real time, and when detecting the selection operation on the first display control, the terminal switches from displaying the second page in full screen to displaying the first page in full screen, creates the second display control, and displays the second display control above the first page. Specific program logic of displaying a display control above a UI may be implemented in any proper manner, which is not specifically limited in the present disclosure.

S208: Display the second display control above the first page.

Figure 5:
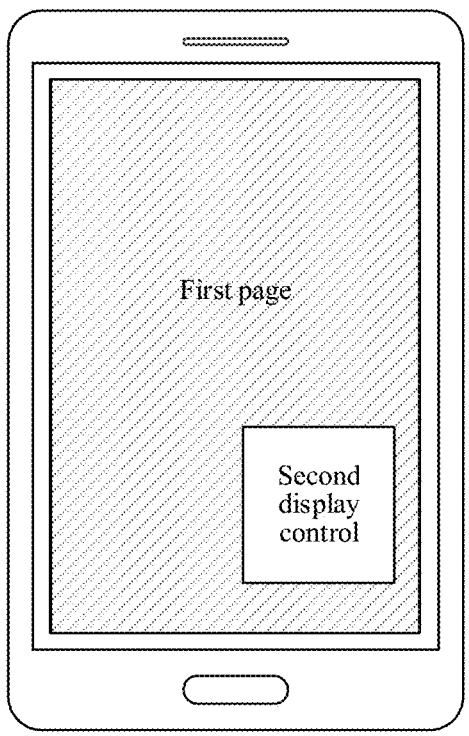
FIG. 5 is a schematic diagram of an interface of a second display control displayed above a first page according to an embodiment.

In one embodiment, after the second display control is created in response to the selection operation on the first display control displayed above the second page, the second display control may be displayed above the first page. Visually, as shown in FIG. 5, the second display control is displayed floating on the second page. A specific description of displaying the second display control above the first page may be the same as the description of displaying the first display control above the second page. Details are not described herein again.

In an embodiment, when detecting the first trigger operation on the first page, the terminal creates a window of a predetermined window type through a system window service (different window types may correspond to different display layers, and a display layer of the window of the predetermined window type is above the UI), and then adds a view corresponding to the first page to the created window, to obtain the first display control. In addition, the second page is invoked, so that the second page is displayed on the display screen of the terminal in full screen, and the first display control is displayed above the second page.

Subsequently, when detecting the selection operation on the first display control displayed above the second page, the terminal creates a window of the predetermined window type through the system window service, and adds a view corresponding to the second page to the created window, to obtain the second display control. In addition, the first page is invoked, so that the first page is displayed on the display screen of the terminal in full screen, and the second display control is displayed above the first page.

For creating a window of the predetermined window type, using Android as an example, a window of a window type TYPE_APPLICATION_ATTACHED_DIALOG may be created through a WindowManager service.

Figure 6:
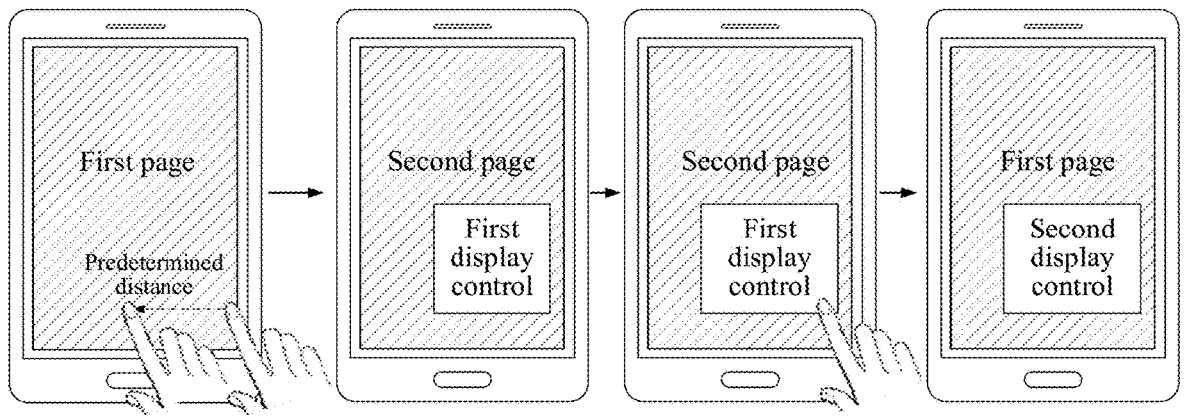
FIG. 6 is a schematic diagram of a page switching process according to an embodiment.

In addition, in practical applications, a process of performing page switching according to the page switching method in one embodiment may be shown in FIG. 6.

According to the page switching method, when detecting the first trigger operation on the first page, the terminal displays the second page and displays the first display control configured to provide an entry to the first page above the second page; and subsequently, when detecting the selection operation on the first display control displayed above the second page, the terminal displays the first page and displays the second display control configured to provide an entry to the second page above the first page. In this way, only a display control displayed above a UI needs to be operated, to switch between the UI and another UI corresponding to the display control, which shortens a user operation path, thereby improving the convenience of page switching.

In an embodiment, after the step of displaying the second display control above the first page, that is, after step S208, the method may further include the following step: displaying the second page and displaying the first display control above the second page in response to a selection operation on the second display control displayed above the first page.

In one embodiment, when displaying the second display control above the first page, the terminal monitors an operation on the second display control in real time, and when detecting the selection operation on the second display control, the terminal switches from displaying the first page in full screen to displaying the second page in full screen, and displays the first display control above the second page.

Figure 7:
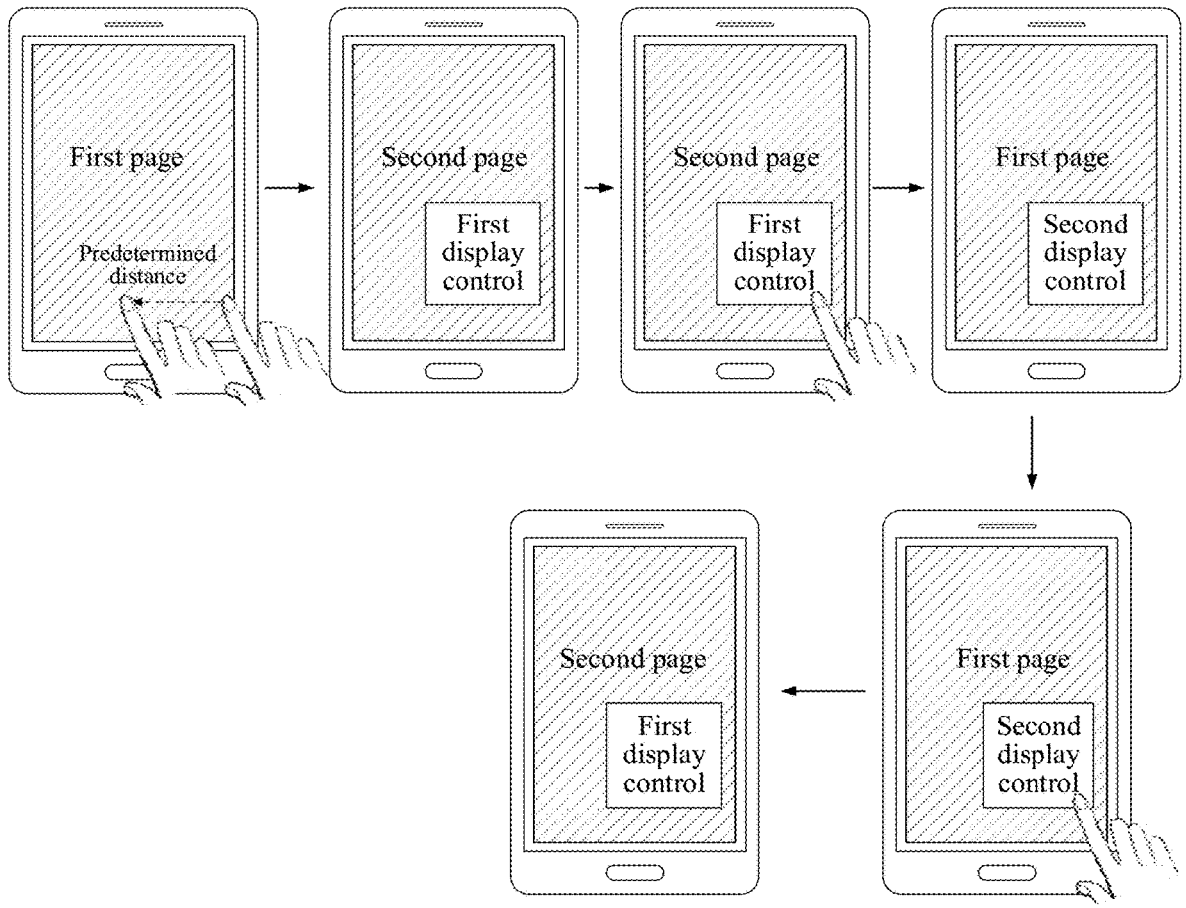
FIG. 7 is a schematic diagram of a page switching process according to an embodiment.

In addition, based on FIG. 6, in practical applications, a process of performing page switching according to the page switching method in one embodiment may be shown in FIG. 7.

In an embodiment, after the step of displaying the first display control above the second page, that is, after step S204, the method may further include the following step: displaying a corresponding third page in response to a second trigger operation on the second page, and displaying the first display control above the third page.

Optionally, the terminal receives the second trigger operation on the second page, displays the third page according to the second trigger operation, and displays the first display control above the third page.

The second trigger operation may be used for triggering the terminal to jump to a corresponding page, and may be a predetermined operation performed by the user on a corresponding function control displayed in a UI. A specific form of the second trigger operation may be set according to an actual requirement providing that the form does not conflict with other functions of the application program. For example, the second trigger operation may be a click/tap operation, a press operation, or the like on the corresponding function control.

Similar to the first page and the second page, the third page is also a UI in an application program. The third page, the second page, and the first page may be three different UIs in the same application program, that is, the third page, the second page, and the first page are used for implementing three different tasks. A specific description of the third page may be the same as the description of the first page and the second page. Details are not described herein again.

Figure 8:
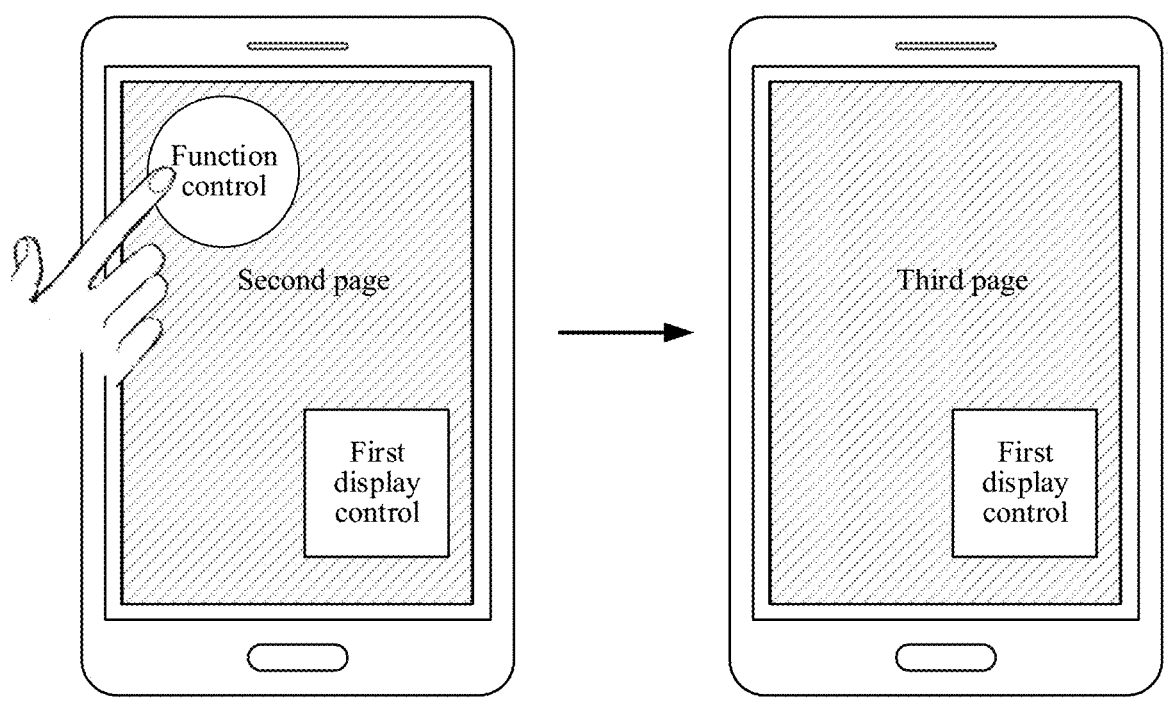
FIG. 8 is a schematic diagram of a page switching process according to an embodiment.

In one embodiment, when displaying the second page and displaying the first display control above the second page, the terminal monitors an operation on the second page in real time, and when detecting the second trigger operation on the corresponding function control on the second page, the terminal jumps from the second page to the third page, and displays the first display control above the third page. In some embodiments, the first page, the second page, and the third page are pages in a same application program directed to different tasks. In addition, in practical applications, a process of performing page switching according to the page switching method in one embodiment may be shown in FIG. 8.

For example, the first page is the Qzone updates page (e.g., an information stream page showing feeds and updates of friend users) of the QQ application, and the second page is the message list page. A display control (that is, the first display control) corresponding to the Qzone updates page is displayed above the message list page. In this case, after the user clicks/taps a function control indicating "Pippi" (that is, a function control providing an entry to a message page of a conversation with the friend "Pippi") in the message list page, the message page of the conversation with the friend "Pippi" is the third page. That is, the terminal switches from displaying the message list page in full screen to displaying the message page of the conversation with the friend "Pippi" in full screen, and displays the display control corresponding to the Qzone updates page above the message page of the conversation with the friend "Pippi".

When receiving a selection operation on the display control corresponding to the Qzone updates page, the terminal displays the Qzone updates page in full screen. Compared with the related art in which the user needs to first exit the message page of the conversation and return to the message list page, and then clicks/taps a Qzone entry to re-enter the Qzone updates page, in one embodiment, a quick switch can be made to the Qzone updates page through a trigger operation on the display control above the message page of the conversation, thereby simplifying the process of page switching.

Description is made by using an example in which one display control is displayed above a UI in the foregoing embodiment. Optionally, at least two display controls may be displayed above the UI of the application program.

In an embodiment, after the step of displaying the first display control above the third page, the method may further include the following step: displaying the second page and create a third display control in response to a third trigger operation on the third page, the third display control being configured to provide an entry to the third page; and displaying the first display control and the third display control above the second page. In some embodiments, the third trigger operation on the third page may be the same as the first trigger operation on the first page.

Optionally, the terminal receives the third trigger operation on the third page, displays the second page and creates the third display control according to the first trigger operation, and displays the first display control and the third display control above the second page.

The third display control is a display control corresponding to the third page, and may be configured to provide an entry to the third page. That is, the terminal may be triggered, by operating the third display control, to display the third page in full screen.

Figure 9:
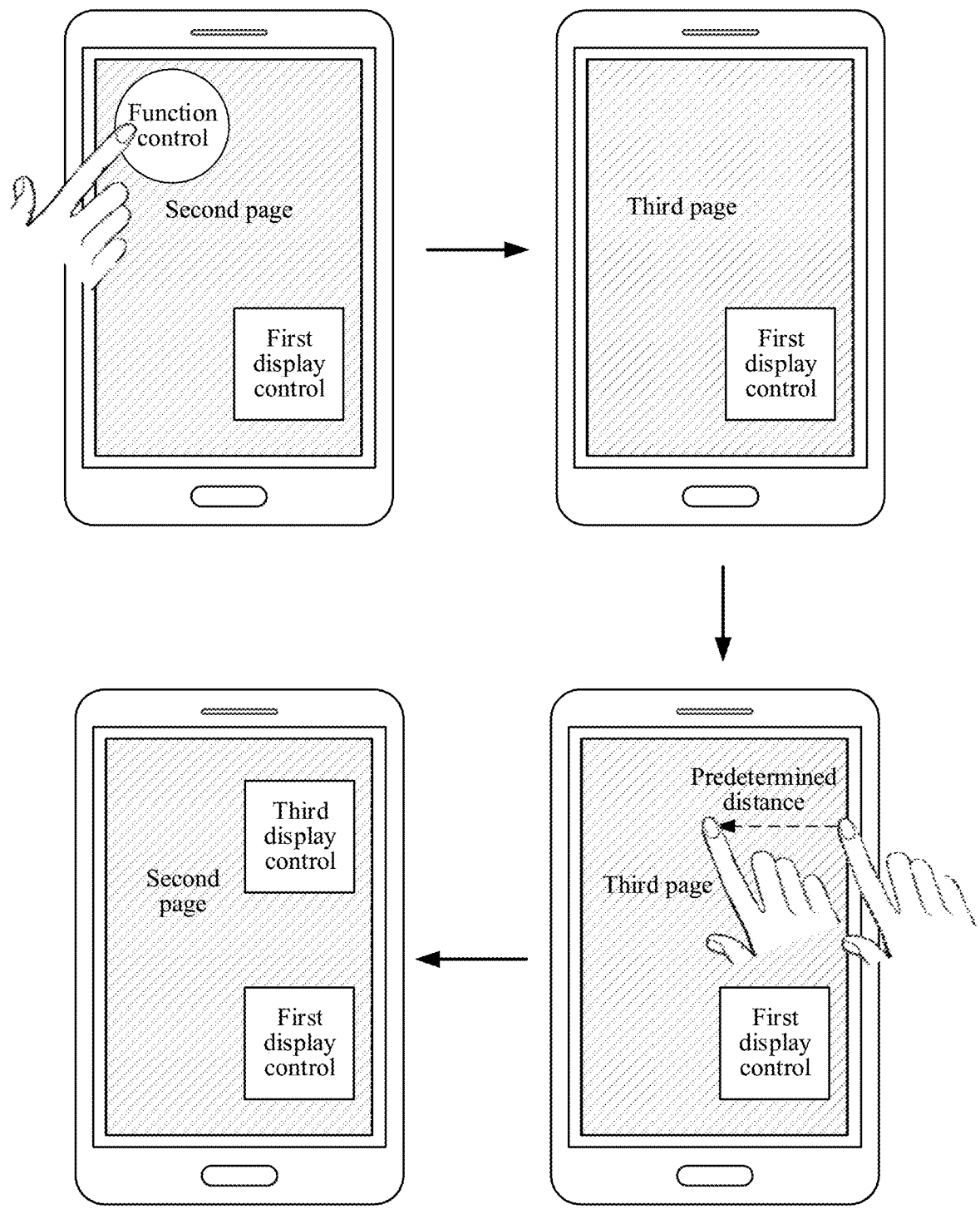
FIG. 9 is a schematic diagram of a page switching process according to an embodiment.

In one embodiment, when displaying the third page and displaying the first display control above the third page, the terminal monitors an operation on the third page in real time, and when detecting the third trigger operation on the third page, the terminal switches from displaying the third page in full screen to displaying the second page in full screen, creates the third display control, and displays the first display control and the third display control above the second page. In addition, based on FIG. 8, in practical applications, a process of performing page switching according to the page switching method in one embodiment may be shown in FIG. 9.

In an embodiment, the page switching method may further include the following step: displaying the second display control and the third display control above the first page in response to a selection operation on the first display control. The selection operation is received when displaying the first display control and the third display control above the second page.

When a quantity of display controls displayed above a UI is greater than one, a user may perform a selection operation on any display control above the UI according to an actual requirement. For example, when the first display control and the third display control are displayed above the second page, the user may perform a selection operation on the first display control or the third display control according to an actual requirement.

After the user performs a selection operation on any display control, the terminal switches from displaying in full screen a page before the selection operation is performed to displaying in full screen a page corresponding to the display control subject to the selection operation.

Figure 10:
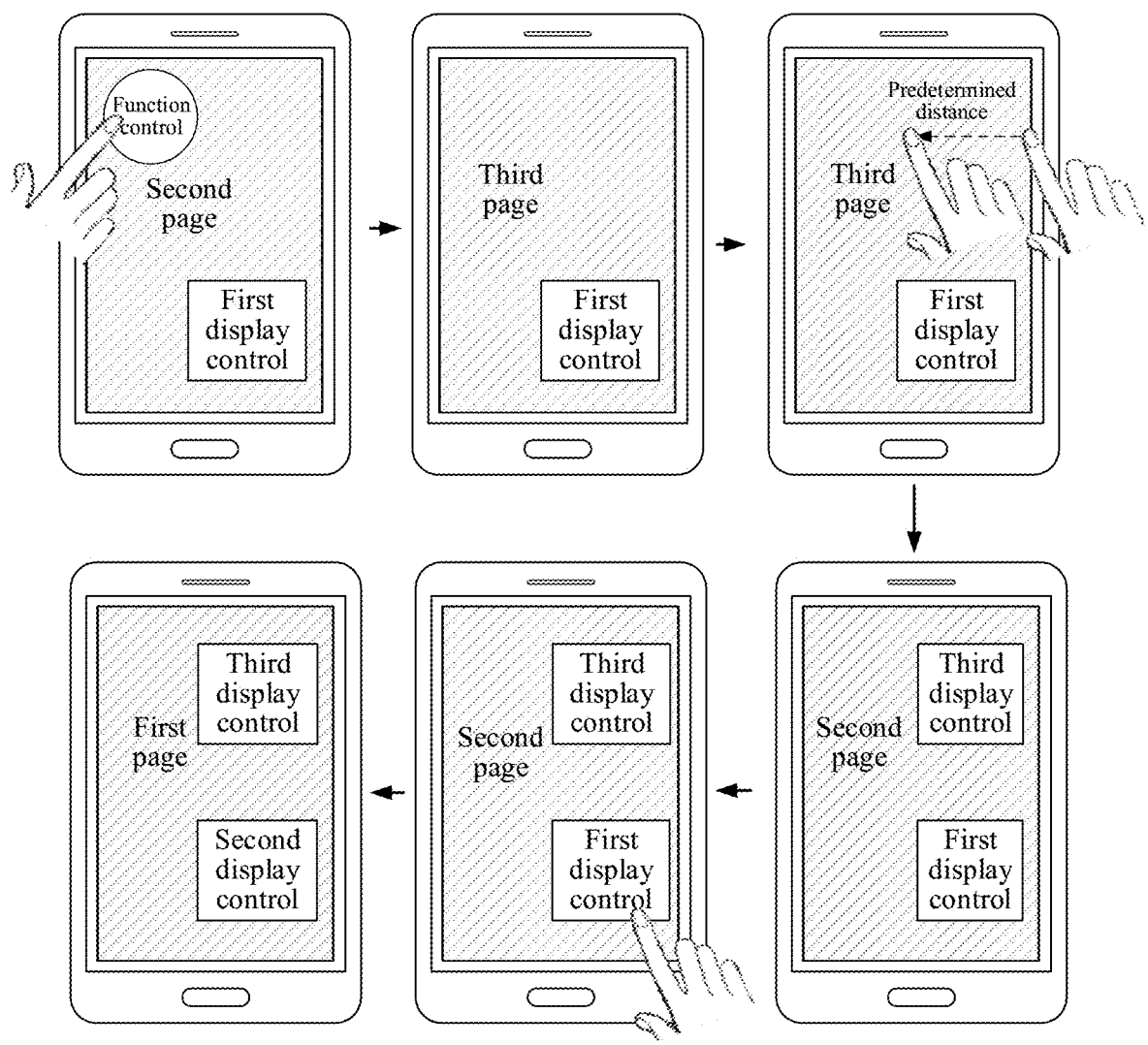
FIG. 10 is a schematic diagram of a page switching process according to an embodiment.

In one embodiment, when the first display control and the third display control are displayed above the second page, after the user performs, according to an actual requirement, a selection operation on the first display control displayed above the second page, the terminal switches from displaying the second page in full screen to displaying the first page in full screen, and displays the second display control and the third display control above the first page. In addition, based on FIG. 9, in practical applications, a process of performing page switching according to the page switching method in one embodiment may be shown in FIG. 10.

In addition, when the second display control and the third display control are displayed above the first page, the user may perform, according to an actual requirement, a selection operation on the second display control or the third display control displayed above the first page. For example, the user performs a selection operation on the second display control displayed above the first page. The terminal switches from displaying the first page in full screen to displaying the second page in full screen, and displays the first display control and the third display control above the second page. A case that the user performs a selection operation on the second display control displayed above the first page is similar thereto. Details are not described herein again.

In an embodiment, the page switching method may further include the following step: displaying the third page and creating the second display control in response to a selection operation on the third display control received during a process of displaying the first display control and the third display control above the second page; and displaying the first display control and the second display control above the third page.

Figure 11:
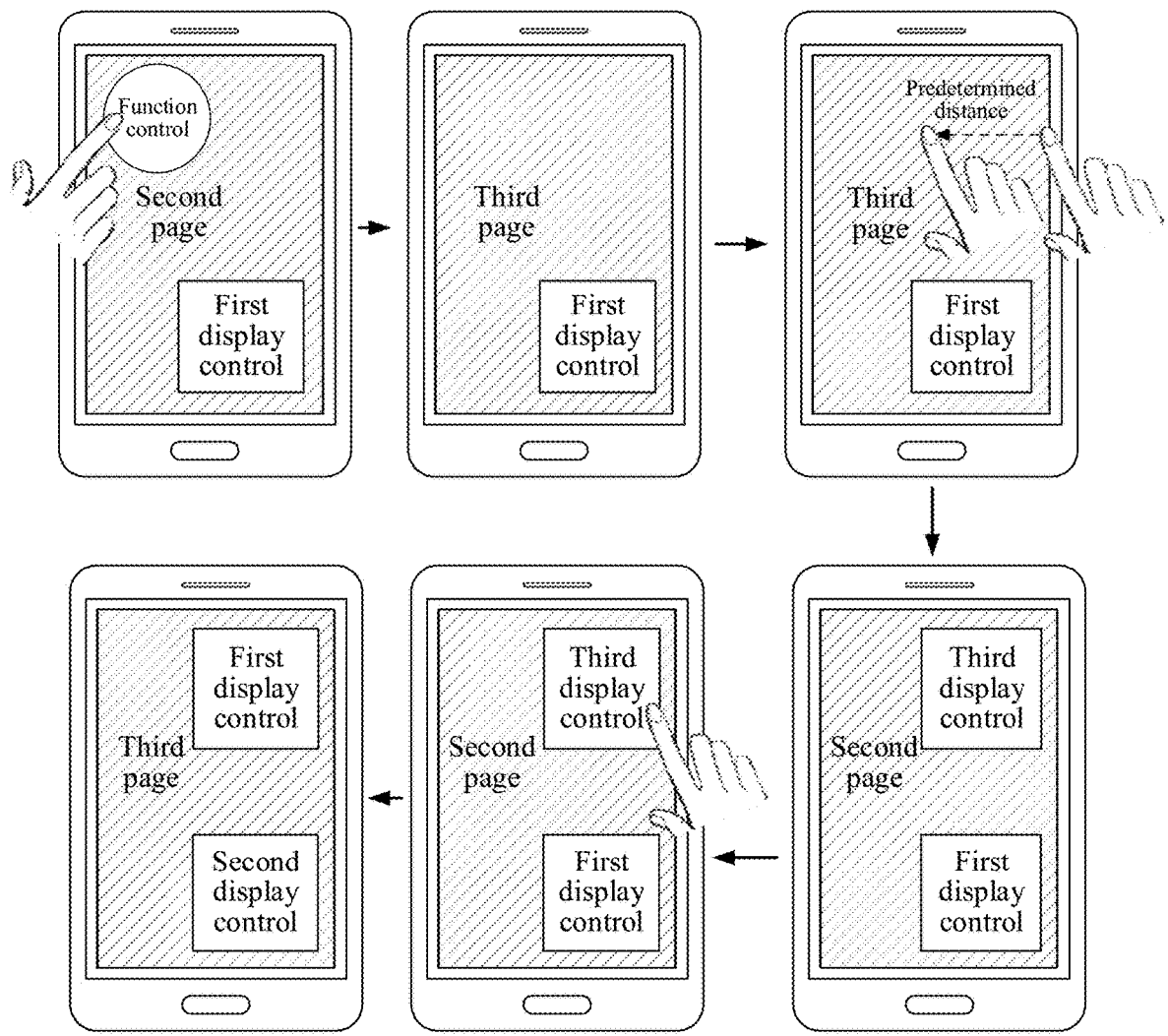
FIG. 11 is a schematic diagram of a page switching process according to an embodiment.

In one embodiment, when the first display control and the third display control are displayed above the second page, after the user performs, according to an actual requirement, the selection operation on the third display control displayed above the second page, the terminal switches from displaying the second page in full screen to the third page displayed in full screen, and displays the second display control and the first display control above the third page. In addition, based on FIG. 9, in practical applications, a process of performing page switching according to the page switching method in one embodiment may be shown in FIG. 11.

Similarly, after the first display control and the second display control are displayed above the third page, the user may perform, according to an actual requirement, a selection operation on the first display control or the second display control displayed above the third page. For example, the user performs a selection operation on the second display control displayed above the third page. The terminal switches from displaying the third page in full screen to displaying the second page in full screen, and displays the first display control and the third display control above the second page. A case that the user performs a selection operation on the first display control displayed above the third page is similar thereto. Details are not described herein again.

In an embodiment, the page switching method may further include the following step: moving, in response to a control drag operation on the first display control, the first display control on a display screen according to a track corresponding to the control drag operation.

The control drag operation may be used for triggering movement of the display control on the display screen of the terminal. For example, the control drag operation on the first display control is used for triggering movement of the first display control on the display screen of the terminal. The control drag operation may be a predetermined operation performed by a user on a display control displayed above a UI. For example, the user slides the display control on the display screen (e.g., on top of the UI) while pressing the display control.

In one embodiment, when a display control is displayed above a UI, an operation on the display control is monitored in real time, when a control drag operation on the display control is detected, the display control is moved on the display screen of the terminal according to a track (that is, a drag track) corresponding to the drag operation. Visually, a user sees that the display control is moved on the UI according to the drag track.

Figure 12:
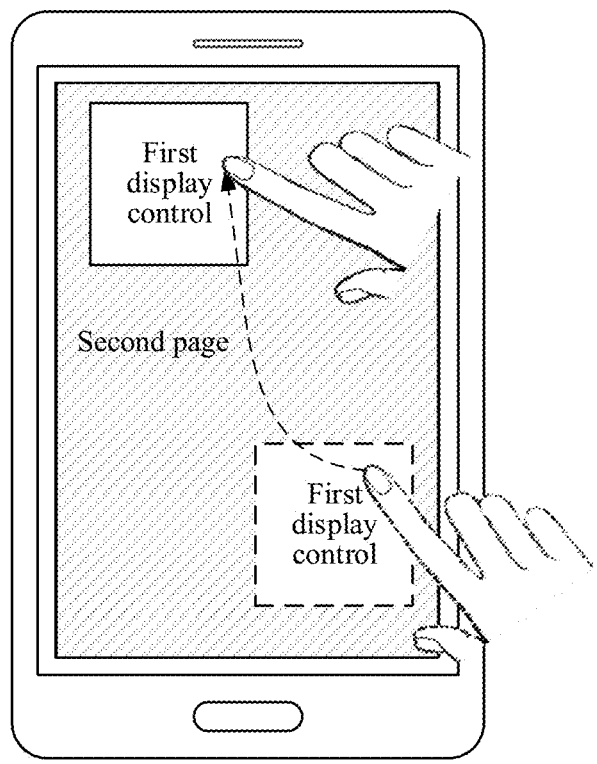
FIG. 12 is a schematic diagram of dragging a first display control according to an embodiment.

In addition, such a drag manner is applicable to any display control such as the first display control, the second display control, or the third display control. Using the first display control as an example, when the first display control is displayed above any UI, and a control drag operation on the first display control is detected, as shown in FIG. 12 (FIG. 12 shows a case that only the first display control is displayed above the second page), the first display control is moved on the display screen of the terminal according to a corresponding drag track (an arrowed dashed line shown in FIG. 12).

In an embodiment, a display position of a window on the display screen may be changed by modifying a window position parameter in layout parameters of the window, to move a corresponding display control on the display screen of the terminal. The window position parameter includes a horizontal coordinate and a vertical coordinate of the window.

Optionally, in a process of dragging a display control, a user may drag the display control into a specified region to delete the display control.

In an embodiment, the page switching method may further include the following step: displaying a control cancellation region on the display screen in a process of moving the first display control; and canceling the displaying of the first display control in a case that an end position of moving the first display control is in the control cancellation region.

The control cancellation region is an interactive region used for triggering cancellation of displaying of a display control, and the control cancellation region may be a predetermined display region on the display screen, for example, a bottom display region of the display screen. In a process of moving the display control, the control cancellation region is continuously displayed on the display screen. If an end position of moving the display control is in the control cancellation region, the displaying of the display control is canceled. For example, when the user drags the display control to the control cancellation region with a finger, and lifts the finger from the display screen in the control cancellation region, the displaying of the display control is canceled. It can be understood that after the displaying of the display control is canceled, the display control is destroyed immediately, and the user cannot see the display control on the display screen. In an embodiment, the displaying of the display control may be canceled by destroying a window.

Figure 13:
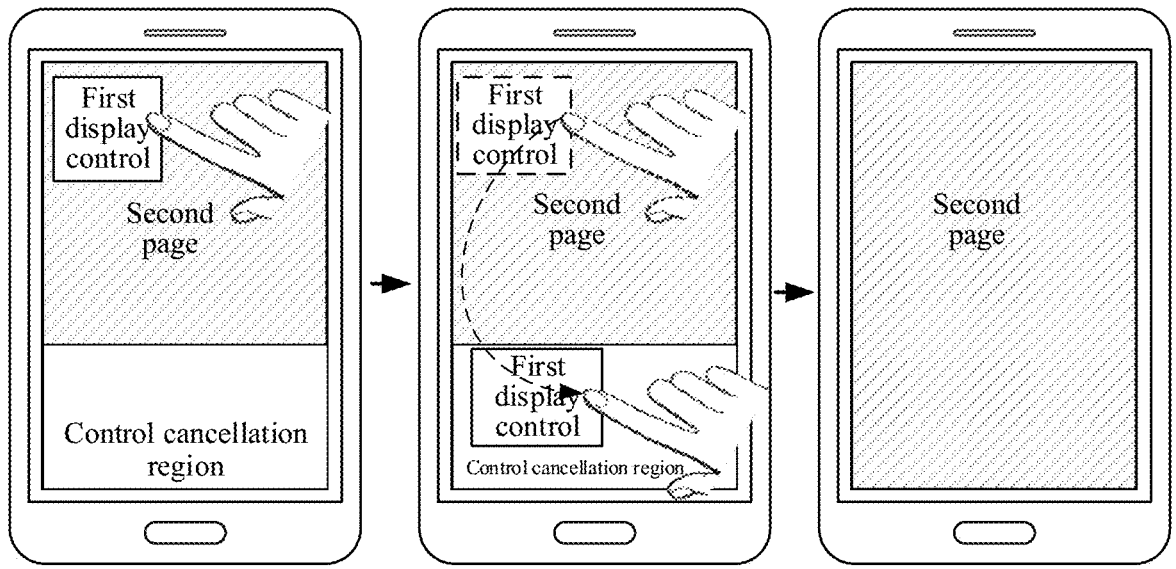
FIG. 13 is a schematic diagram of canceling displaying of a first display control according to an embodiment.

In addition, such a manner of canceling displaying of a display control is applicable to any display control such as the first display control, the second display control, or the third display control. Using the first display control as an example, when the first display control is displayed above any UI, in a process of moving the first display control through a control drag operation, as shown in FIG. 13 (FIG. 13 shows a case that only the first display control is displayed above the second page), the control cancellation region is continuously displayed on the display screen, and if an end position of moving the first display control is in the control cancellation region, the displaying of the first display control is canceled.

In other embodiments, the displaying of the display control may alternatively be canceled by using a menu with a function of canceling displaying of a display control. Optionally, a button used for canceling displaying of a display control may be set in the menu, and when a display control is displayed above a UI, displaying of the corresponding display control may be canceled by invoking the menu in the UI and clicking/tapping the button used for canceling displaying of a display control in the menu.

In an embodiment, the page switching method may further include the following step: stopping the first display control at a screen edge position closest to the end position in a case that the end position is outside the control cancellation region.

Figure 14:
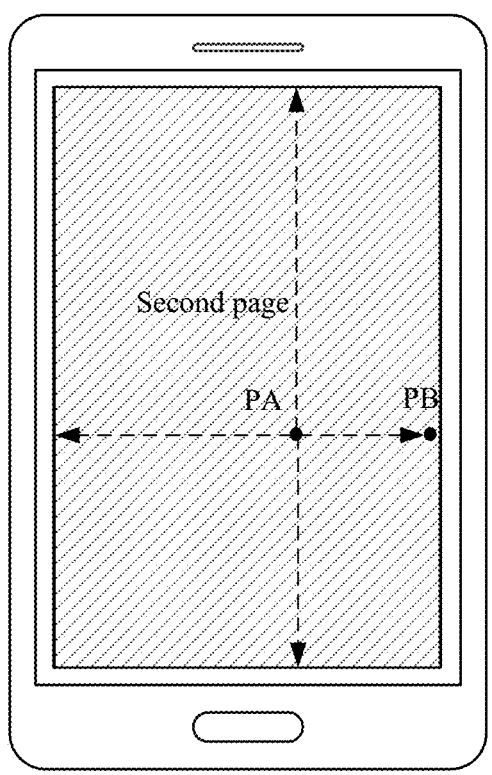
FIG. 14 is a schematic diagram of a closest screen edge position according to an embodiment.

If the end position of moving the display control is outside the control cancellation region, it indicates that the user does not need to cancel the displaying of the display control, but needs to change the display position of the display control on the display screen. In this case, after the end position of moving the display control is obtained, the display control may be stopped at a screen edge position closest to the obtained end position. That is, after the movement ends, the display control is displayed at the screen edge position. For example, as shown in FIG. 14, after a display control is moved once, if an end position of moving the display control is at a PA position, and it is determined that a right screen edge position is closest to the PA position, the display control is stopped at a PB position on a right screen edge, that is, the display control is displayed at the PB position. Specific program logic of determining a screen edge position closest to a specific position may be implemented in any proper manner, which is not specifically limited in the present disclosure.

Such a stopping manner is applicable to any display control such as the first display control, the second display control, or the third display control. Using the first display control as an example, if the end position of moving the first display control is outside the control cancellation region, the first display control is stopped at a screen edge position closest to the end position.

In addition, a UI below the display control can effectively be less blocked by stopping the display control at the screen edge position closest to the end position.

In other embodiments, after the end position of moving the display control is obtained, the display control may be directly stopped at the end position, that is, the display control is directly displayed at the end position. For example, after the display control is moved once, if the end position of moving the display control is the PA position, the display control is directly stopped at the PA position, that is, the display control is displayed at the PA position.

In an embodiment, the page switching method may further include the following step: synchronously displaying page content of the first page in the first display control.

In one embodiment, the first display control may be a view window (a thumbnail window), and the page content of the first page may be synchronously displayed in the view window. That is, display content in the first display control is consistent with the page content of the first page in real time.

Figure 15A:
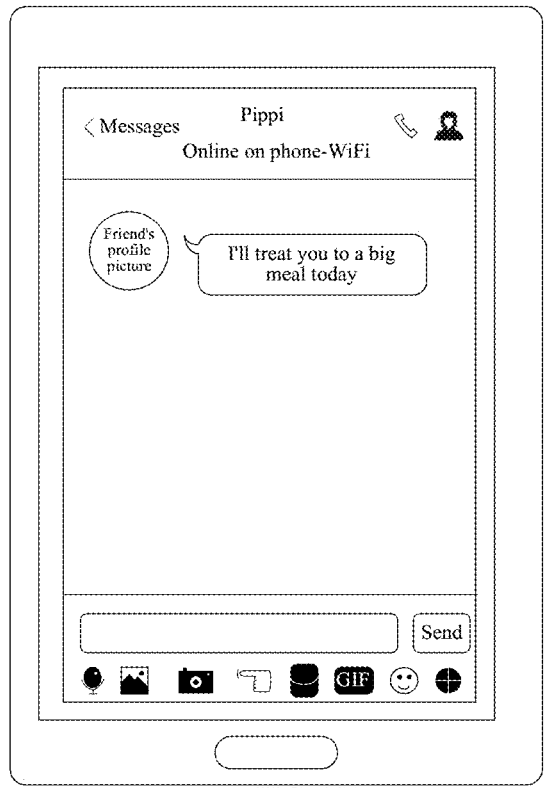
FIG. 15A-15D are schematic diagrams in which a display control synchronously displays page content of a corresponding page according to some embodiments.
Figure 15B:
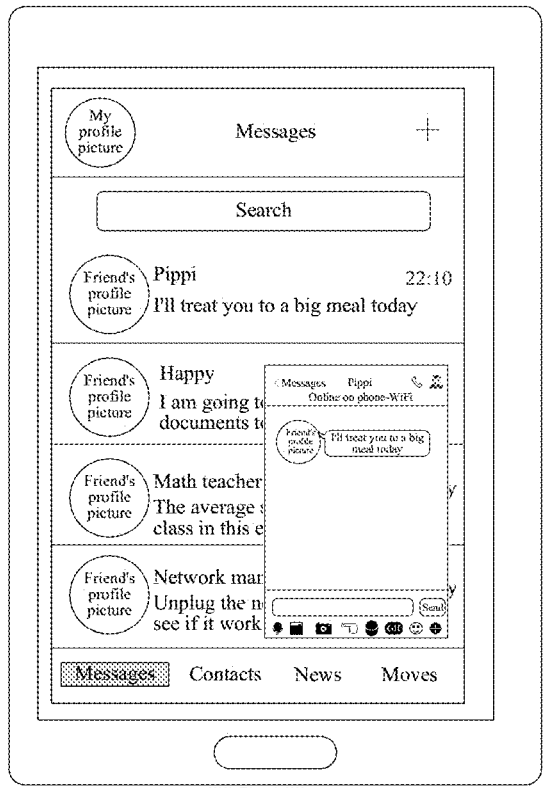
Figure 15C:
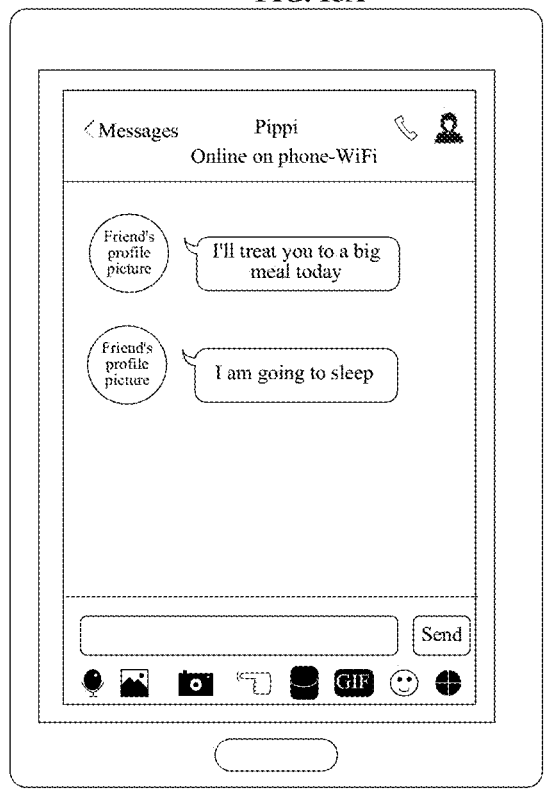
Figure 15D:
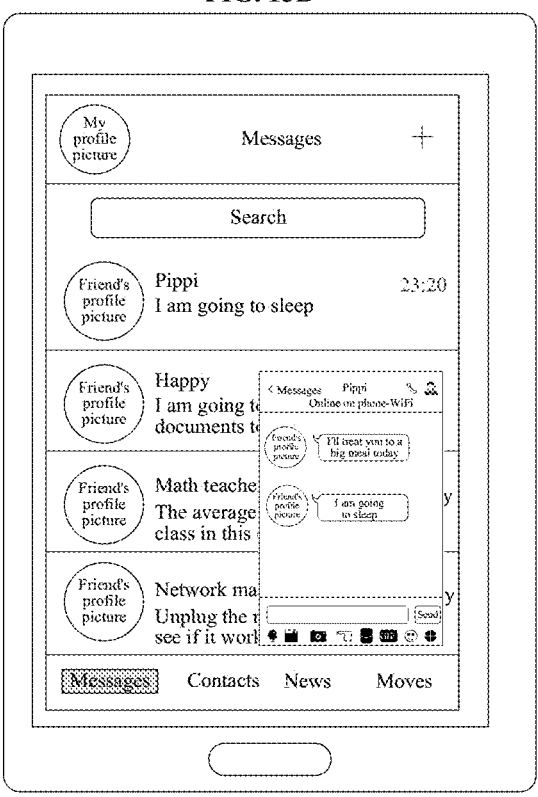

For example, it is assumed that at a moment T1, the terminal displays the second page and displays the first display control corresponding to the first page above the second page, the second page being the message list page, and the first page being the message page of the conversation with the friend "Pippi", and at the moment T1, the message page of the conversation with the friend "Pippi" is shown in FIG. 15A. In this case, as shown in FIG. 15B, at the moment T1, display content in the first display control above the second page is also page content of the message page of the conversation shown in FIG. 15A. Subsequently, at a moment T2 after the moment T1, the friend "Pippi" sends a new message "I am going to sleep", and the message page of the conversation with the friend "Pippi" is updated from FIG. 15A to FIG. 15C. At this moment, as shown in FIG. 15D, the display content in the first display control is also updated from the page content of the message page of the conversation shown in FIG. 15A to page content of the message page of the conversation shown in FIG. 15C.

In addition, any display control can synchronously display page content in a UI corresponding to the display control. For example, page content of the second page may be also synchronously displayed in the second display control, and page content of the third page may be also synchronously displayed in the third display control.

In other embodiments, display content in the display control may alternatively be preset. In this case, the display content of the display control remains unchanged during a life cycle of the display control.

In one embodiment, page content in a page is synchronously displayed in a corresponding display control, so that a user can determine, by observing the display control, whether currently there is a need to switch to the corresponding page for operation, thereby improving the efficiency and timeliness of page switching.

In an embodiment, a manner for determining the second page includes: obtaining a preset page, the second page including the preset page.

It can be understood that before the second page is displayed, the second page needs to be determined first. For example, when the first trigger operation on the first page is detected, the second page is determined first, and then the determined second page is displayed.

The preset page may be a UI pre-selected from UIs in an application program. In one embodiment, for any application program, a UI may be pre-selected from UIs in the application program as a preset page (that is, a second page). Subsequently, when the user performs a first trigger operation on any UI other than the preset page, the terminal switches from displaying the UI on which the first trigger operation acts to the preset page, and displays, above the preset page, a display control corresponding to the UI on which the first trigger operation acts.

In an embodiment, a default UI of an application program may be selected as a second page. The default UI may be the first UI displayed after the application program is opened. The default UI may be set by default by the application program, or may be preset by a user. For example, for the QQ application, a default UI is the message list page.

In an embodiment, a manner for determining the second page may include the following steps: displaying a target page selection page in a case that the first trigger operation on the first page is detected, the target page selection page including candidate page controls; and determining a selected page control from the candidate page controls in response to a page selection operation on the candidate page control, the second page including a page corresponding to the selected page control.

The target page selection page is a UI used for the user to select the second page. The target page selection page may present a plurality of candidate page controls. Each candidate page control corresponds to one UI. For example, the target page selection page presents three candidate page controls D1, D2, and D3, and the candidate page controls D1 to D3 respectively correspond to three different UIs. Using the QQ application as an example, a UI corresponding to the candidate page control D1 is the message list page, a UI corresponding to the candidate page control D2 is the contact list page, and a UI corresponding to the candidate page control D3 is the Qzone updates page.

The page selection operation may be used for triggering the selected page control to be determined from the candidate page controls. The page selection operation may be a predetermined operation performed by a user on a candidate page control. A specific form of the page selection operation may be set according to an actual requirement providing that the form does not conflict with other functions of the application program. For example, the page selection operation may be a click/tap operation, a press operation, or the like on a candidate page control.

The selected page control is a candidate page control on which the page selection operation acts. After the target page selection page presents a plurality of candidate page controls, the terminal monitors operations on the plurality of candidate page controls in real time. A user may perform a page selection operation on one of the plurality of candidate page controls according to an actual requirement. After detecting the page selection operation, the terminal uses a candidate page control on which the page selection operation acts as a selected page control. In one embodiment, the second page is a page corresponding to the selected page control, that is, a UI corresponding to the selected page control. For example, for the QQ application, the candidate page control D2 is determined as the selected page control according to a page selection operation, and the second page is the contact list page.

Figure 16:
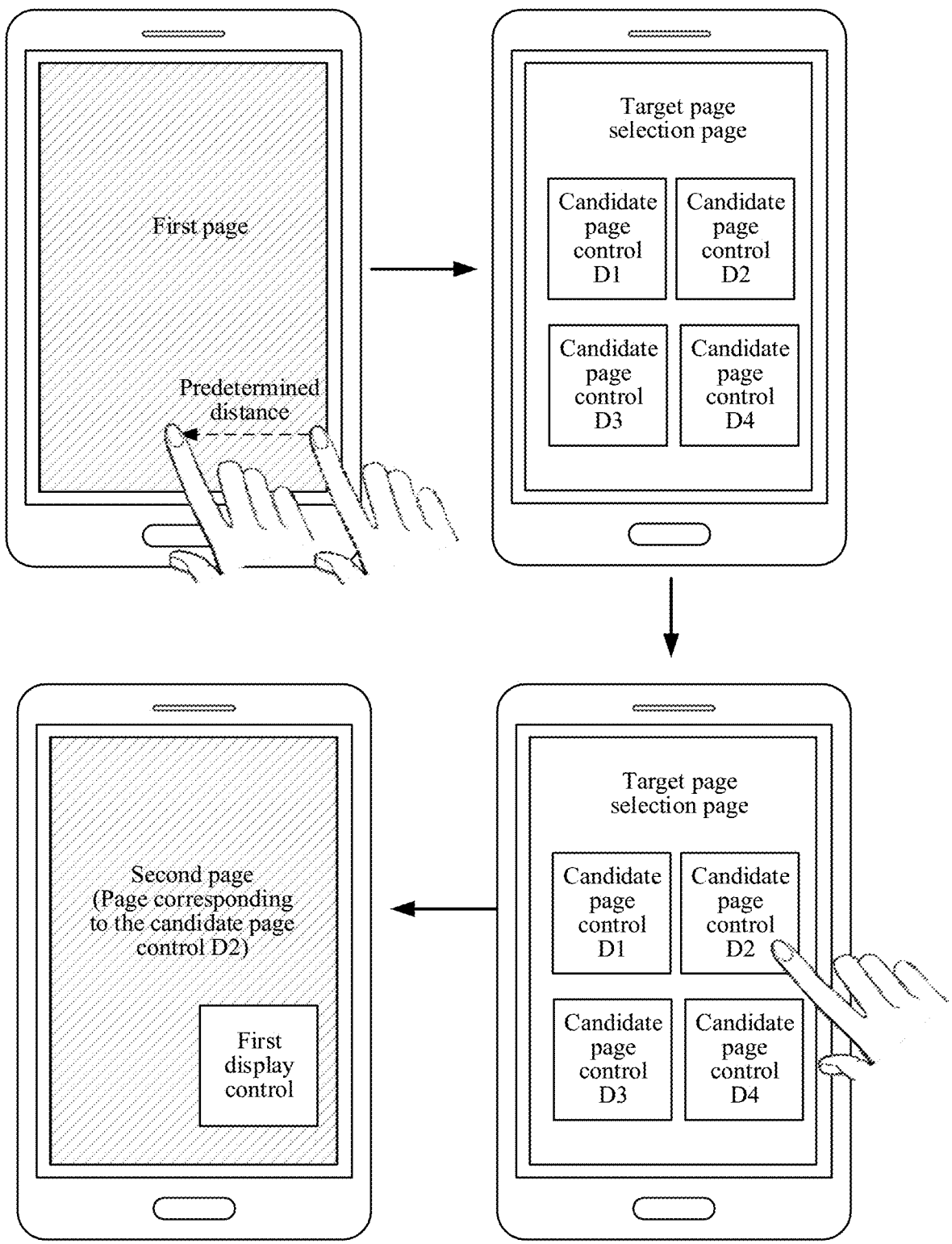
FIG. 16 is a schematic diagram of determining a second page through a target page selection page according to an embodiment.

For example, as shown in FIG. 16, when displaying a first page in full screen, and detecting a first trigger operation on the first page, the terminal displays a target page selection page first, the target page selection page presenting candidate page controls D1, D2, D3, and D4. It is assumed that the user performs a page selection operation on the candidate page control D2. After detecting the page selection operation, the terminal displays a second page (that is, a page corresponding to the candidate page control D2) in full screen, and displays a first display control above the page corresponding to the candidate page control D2.

In addition, in practical applications, candidate page controls on which the user performs page selection operations at different times may be different, and therefore, second pages determined at the different times may also be different. For example, if the user performs a page selection operation on the candidate page control D2 the first time, a second page determined for the page selection operation is a UI corresponding to the candidate page control D2. Subsequently, if the user performs a page selection operation on the candidate page control D1 the second time, a second page determined for the page selection operation is a UI corresponding to the candidate page control D1.

In one embodiment, when the first trigger operation on the first page is received, a plurality of candidate page controls are displayed in the target page selection page for the user to select, and a page corresponding to a candidate page control selected by the user is determined as a second page, which makes it convenient for the user to subsequently switch between the first page and the selected second page through a display control, thereby avoiding a limitation caused by using a default UI as a second page.

The page switching methods according to the foregoing embodiments may be combined according to an application scenario, and the combination manner of the embodiments is not limited in the embodiments of the present disclosure.

Figure 17:
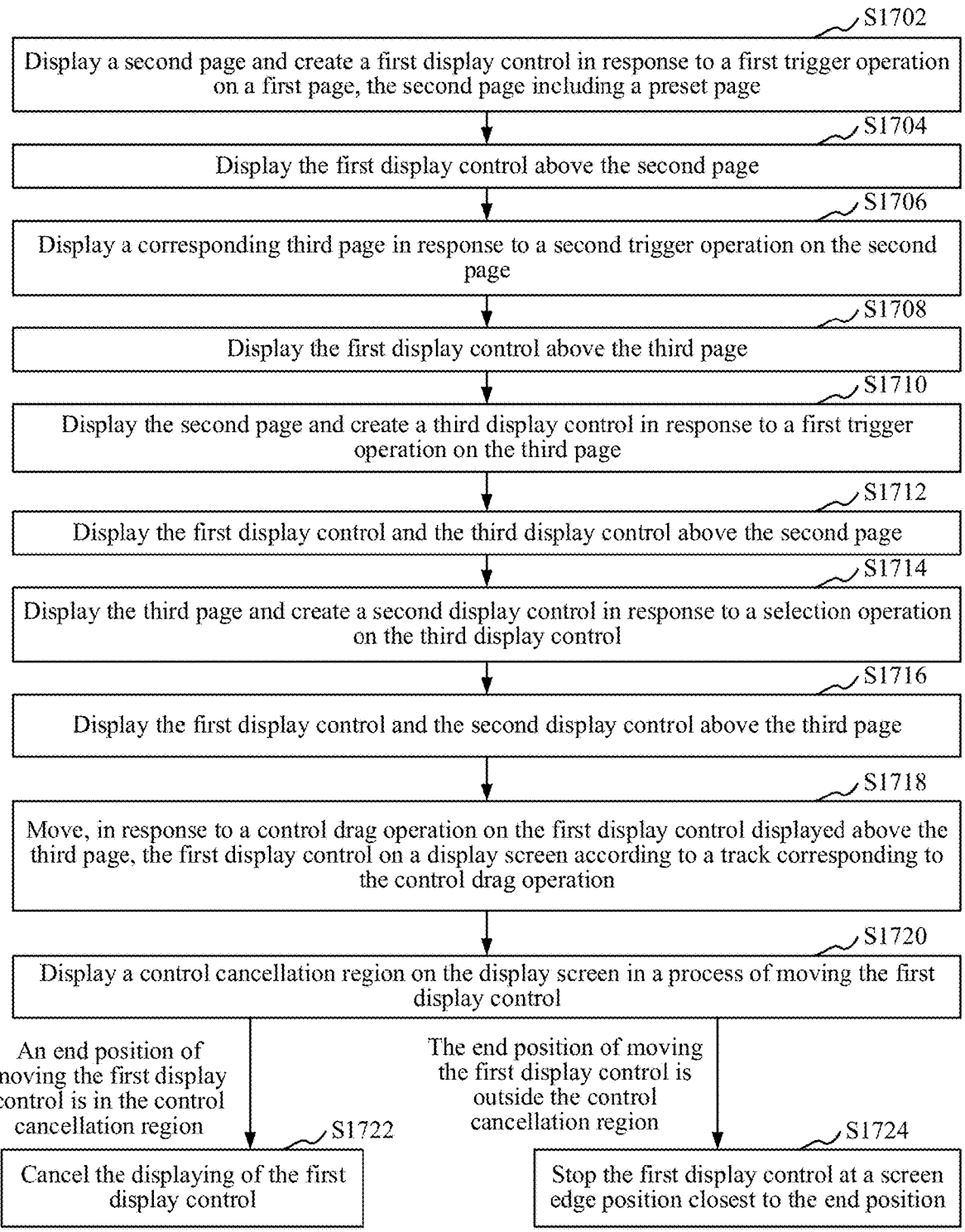
FIG. 17 is a schematic flowchart of a page switching method according to an embodiment.

In an embodiment, as shown in FIG. 17, a page switching method is provided. The method may include the following steps S1702 to S1724.

S1702: Display a second page and create a first display control configured to provide an entry to a first page in response to a first trigger operation on the first page, the second page including a preset page.

S1704: Display the first display control above the second page.

S1706: Display a corresponding third page in response to a second trigger operation on the second page.

S1708: Display the first display control above the third page.

S1710: Display the second page and create a third display control in response to a third trigger operation on the third page.

S1712: Display the first display control and the third display control above the second page.

S1714: Display the third page and create a second display control in response to a selection operation on the third display control.

S1716: Display the first display control and the second display control above the third page.

S1718: Move, in response to a control drag operation on the first display control displayed above the third page, the first display control on a display screen according to a track corresponding to the control drag operation.

S1720: Display a control cancellation region on the display screen in a process of moving the first display control.

S1722: Cancel the displaying of the first display control in a case that an end position of moving the first display control is in the control cancellation region.

S1724: Stop the first display control at a screen edge position closest to the end position in a case that the end position is outside the control cancellation region.

A specific description of technical features in this embodiment are the same as the foregoing description of corresponding technical features. Details are not described herein again.

In addition, according to the foregoing embodiments, description is made below by using the QQ application as an example.

After a user opens the QQ application on a terminal, the terminal displays the message list page of the QQ application. After the user clicks/taps an icon control indicating "updates" on a navigation bar, the terminal displays the SNS management page. Then, after the user clicks/taps an icon control indicating "friends' updates" on the SNS management page, the terminal displays the Qzone updates page. After the user slides to the left from a right edge of a display screen over a predetermined distance on the Qzone updates page, after detecting the slide-to-left operation, the terminal creates a display control (referred to as a display control C1 for short below) configured to provide an entry to the Qzone updates page, displays the message list page, and displays the display control C1 above the message list page. Subsequently, after the user clicks/taps an icon control indicating "Pippi" (that is, an icon control configured to provide an entry to the message page of the conversation with the friend "Pippi") in the message list page, the terminal switches from displaying the message list page to displaying the message page of the conversation with the friend "Pippi". Then, after the user slides to the left from the right edge of the display screen over the predetermined distance on the message page of the conversation with the friend "Pippi", after detecting the slide-to-left operation, the terminal creates a display control (referred to as a display control C2 for short below) configured to provide an entry to the message page of the conversation with the friend "Pippi", displays the message list page, and displays the display control C2 and the display control C1 above the message list page.

When the display control C2 and the display control C1 are displayed above the message list page, if the user clicks/taps the display control C2 displayed above the message list page, the terminal displays the message page of the conversation with the friend "Pippi", creates a display control (referred to as a display control C3 for short below) configured to provide an entry to the message list page, and displays the display control C3 and the display control C1 above the message page of the conversation with the friend "Pippi". If the user clicks/taps the display control C1 displayed above the message list page, the terminal displays the Qzone updates page, creates the display control C3, and displays the display control C3 and the display control C2 above the Qzone updates page.

Under a proper condition, it is to be understood that, although the steps in the flowcharts according to the foregoing embodiments are sequentially performed according to the indication of arrows, the steps are not necessarily sequentially performed according to the sequence indicated by the arrows. Unless explicitly specified in the present disclosure, the sequence of the steps is not strictly limited, and the steps may be performed in other sequences. Besides, at least some steps in the flowcharts may include a plurality of sub-steps or a plurality of stages, the sub-steps or stages are not necessarily performed at the same moment and may be performed at different moments, the sub-steps or stages are not necessarily sequentially performed, and the sub-steps or stages and at least some of other steps or sub-steps or stages of other steps may be performed in turn or alternately.

Figure 18:
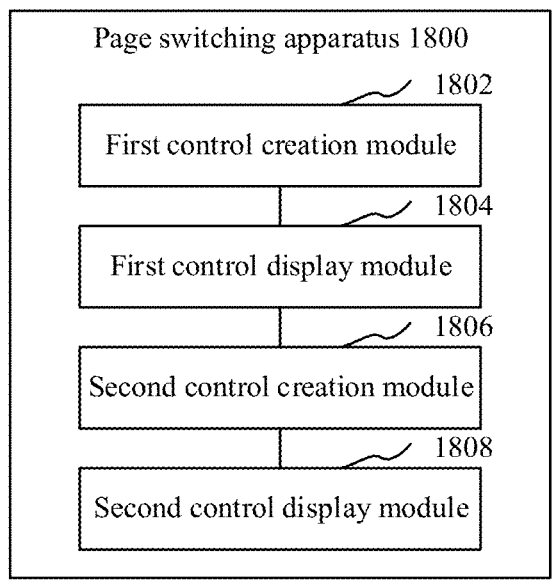
FIG. 18 is a structural block diagram of a page switching apparatus according to an embodiment.

In an embodiment, as shown in FIG. 18, a page switching apparatus 1800 is provided. The apparatus may include the following modules 1802 to 1808.

A first control creation module 1802 is configured to display a second page and create a first display control in response to a first trigger operation on a first page, the first display control being configured to provide an entry to the first page.

A first control display module 1804 is configured to display the first display control above the second page.

A second control creation module 1806 is configured to display the first page and create a second display control in response to a selection operation on the first display control displayed above the second page, the second display control being configured to provide an entry to the second page.

A second control display module 1808 is configured to display the second display control above the first page.

When detecting the first trigger operation on the first page, the page switching apparatus 1800 displays the second page and displays the first display control configured to provide an entry to the first page above the second page; and subsequently, when detecting the selection operation on the first display control displayed above the second page, displays the first page and displays the second display control configured to provide an entry to the second page above the first page. In this way, only a display control displayed above a UI needs to be operated, to switch between the UI and another UI corresponding to the display control, which shortens a user operation path, thereby improving the convenience of page switching.

In an embodiment, the page switching apparatus 1800 may further include the following module:

a page switching module, configured to display the second page and display the first display control above the second page in response to a selection operation on the second display control displayed above the first page.

In an embodiment, the page switching apparatus 1800 may further include the following module:

a page jumping module, configured to display a corresponding third page in response to a second trigger operation on the second page, and display the first display control above the third page.

In an embodiment, the page switching apparatus 1800 may further include the following modules: a third creation module, configured to display the second page and create a third display control in response to a third trigger operation on the third page, the third display control being configured to provide an entry to the third page; and a third control display module, configured to display the first display control and the third display control above the second page.

The second control display module 1808 is specifically configured to display the second display control and the third display control above the first page.

In an embodiment, the page switching apparatus 1800 may further include the following modules: a control selection module, configured to display the third page and create the second display control in response to a selection operation on the third display control, in a process of displaying the first display control and the third display control above the second page; and a first multi-control display module, configured to display the first display control and the second display control above the third page.

In an embodiment, the page switching apparatus 1800 may further include the following module: a control drag module, configured to move, in response to a control drag operation on the first display control, the first display control on a display screen according to a track corresponding to the control drag operation.

In an embodiment, the page switching apparatus 1800 may further include the following modules: a cancellation region display module, configured to display a control cancellation region on the display screen in a process of moving the first display control; and a first control cancellation module, configured to cancel the displaying of the first display control in a case that an end position of moving the first display control is in the control cancellation region.

In an embodiment, the page switching apparatus 1800 may further include the following module: a first control stop module, configured to stop the first display control at a screen edge position closest to the end position in a case that the end position is outside the control cancellation region.

In an embodiment, the page switching apparatus 1800 may further include at least one of the following two modules: a first synchronous display module, configured to synchronously display page content of the first page in the first display control; and a second synchronous display module, configured to synchronously display page content of the second page in the second display control.

In an embodiment, the page switching apparatus 1800 may further include a second page determining module, configured to obtain a preset page, the second page including the preset page; and determine the preset page as the second page.

In an embodiment, the page switching apparatus 1800 may further include a second page determining module, and the second page determining module may include the following units: a selection page display unit, configured to display a target page selection page in a case that the first trigger operation on the first page is detected, the target page selection page including candidate page controls; and a selected page control determining unit, configured to determine a selected page control from the candidate page controls in response to a page selection operation on the candidate page control; and determine a page corresponding to the selected page control as the second page.

For a specific description of the page switching apparatus 1800, reference may be made to the description of the page switching method. Details are not described herein again. All or some of the modules in the page switching apparatus 1800 may be implemented by software, hardware, or a combination thereof. The modules may be embedded in or independent of a processor in a computer device in a form of hardware, or may be stored in a memory in the computer device in a form of software, and invoked by the processor to perform operations corresponding to the modules.

In an embodiment, a computer device is provided, including a memory and a processor, the memory storing a computer program, the processor, when executing the computer program, implementing the operations of the page switching method according to any embodiment of the present disclosure.

Figure 19:
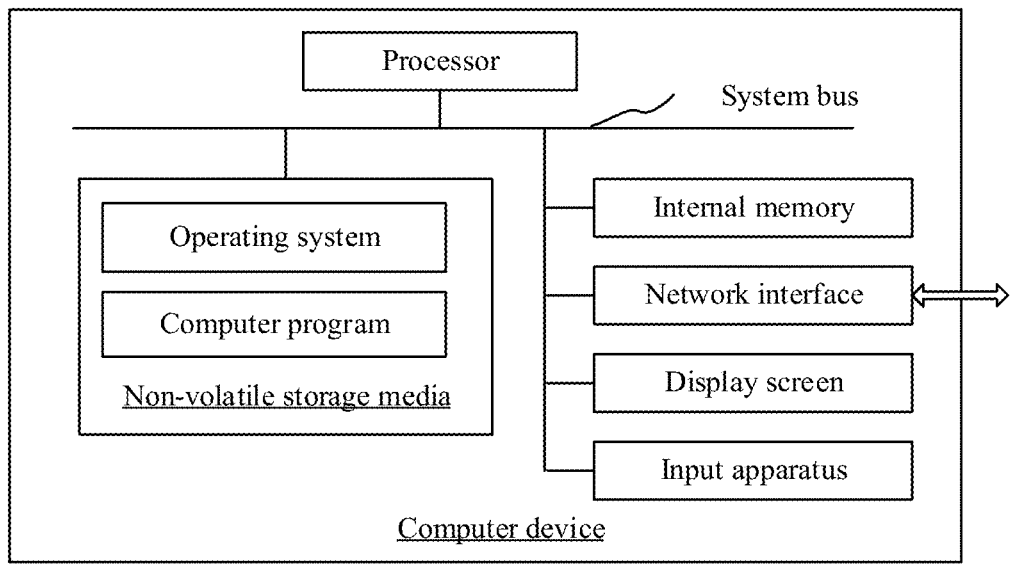
FIG. 19 is a structural block diagram of a computer device according to an embodiment.

In an embodiment, the computer device may be the terminal 110 shown in FIG. 1, and a diagram of an internal structure thereof may be shown in FIG. 19. The computer device includes a processor, a memory, a network interface, a display screen, and an input apparatus that are connected by using a system bus. The processor is configured to provide computation and control capabilities. The memory includes a non-volatile storage medium and an internal memory. The non-volatile storage medium stores an operating system and a computer program, and the internal memory provides an environment for running the operating system and the computer program in the non-volatile storage medium. When the computer program is executed by the processor, a page switching method is implemented. The network interface is configured to communicate with an external terminal through a network connection. The display screen may be a liquid crystal display screen or an electronic ink display screen. The input apparatus of the computer device may be a touch layer covering the display screen, or may be a button, a trackball, or a touch panel disposed on a housing of the computer device, or may be an external keyboard, touch panel, mouse, or the like.

A person skilled in the art may understand that, the structure shown in FIG. 19 is only a block diagram of a partial structure related to the solution of the present disclosure, and does not limit the computer device to which the solution of the present disclosure is applied. Specifically, the computer device may include more or fewer components than those shown in the figure, or some components may be combined, or a different component deployment may be used.

In an embodiment, the page switching apparatus provided in the embodiments of the present disclosure may be implemented in the form of a computer-readable program, and the computer-readable program may run on the computer device shown in FIG. 19. The memory of the computer device may store program modules forming the page switching apparatus, such as the first control creation module 1802, the first control display module 1804, the second control creation module 1806, and the second control display module 1808 shown in FIG. 18. Computer programs formed by the program modules cause the processor to perform the steps in the page switching method in the embodiments of the present disclosure described in this specification. For example, the computer device shown in FIG. 19 may perform step S202 by using the first control creation module 1802 in the page switching apparatus shown in FIG. 18, perform step S204 by using the first control display module 1804, perform step S206 by using the second control creation module 1806, perform the step S208 by using second control display module 1808, or the like.

A person of ordinary skill in the art may understand that all or some of the processes in the method of the foregoing embodiments may be implemented and completed by using the computer programs to instruct related hardware. The programs may be stored in a non-volatile computer-readable storage medium, and the programs, when executed, may include the processes of the foregoing method embodiments. Any reference to the memory, storage, a database, or other media used in the embodiments provided in the present disclosure may include a non-volatile and/or volatile memory. The non-volatile memory may include a read only memory (ROM), a programmable ROM (PROM), an electrically programmable ROM (EPROM), an electrically erasable programmable ROM (EEPROM) or a flash memory. The volatile memory may include a random access memory (RAM) or an external high-speed cache memory. For the purpose of description instead of limitation, the RAM is available in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SLDRAM), a Rambus (Rambus) direct RAM (RDRAM), a direct Rambus dynamic RAM (DRDRAM), and a Rambus dynamic RAM (RDRAM).

Based on this, in an embodiment, a computer-readable storage medium is provided, storing a computer program, the computer program, when executed by a processor, implementing the page switching method according to any embodiment in the present disclosure.

The technical features in the embodiments may be randomly combined. To make the description concise, not all possible combinations of the technical features in the foregoing embodiments are described. However, combinations of the technical features shall all be considered as falling within the scope described in this specification provided that the combinations of the technical features do not conflict with each other.

The embodiments only describe several implementations of the present disclosure, and are specifically described in detail, but are to be not construed as limitation to the patent scope of the present disclosure. A person of ordinary skill in the art may further make variations and improvements without departing from the ideas of the present disclosure. These all fall within the protection scope of the present disclosure. Therefore, the protection scope of the patent of the present disclosure shall be subject to the appended claims.

What is claimed is:

1. A page switching method performed by a page switching apparatus, the page switching method comprising:
    displaying a first page on a display;
    switching the display from displaying the first page to displaying a second page, creating a first display control, and displaying the first display control at an upper layer of the second page in response to a first trigger operation on the first page, the first display control being configured to provide an entry to the first page, wherein the first page and the second page are two different user interfaces of a same application program, wherein the first page includes a message list for messages between a user and friends, and the second page includes a message window showing a chat record of the user with a conversing friend, and wherein the message list presents a name or a profile picture of the user and a list of the friends of the user including the conversing friend;
    switching the display from displaying the second page to displaying the first page and creating a second display control in response to a selection operation on the first display control displayed at the upper layer of the second page, the second display control being configured to provide an entry to the second page;
    displaying the second display control at an upper layer of the first page, wherein the second display control was not previously displayed with the first page, and displaying the second display control further comprises:
        displaying inside of the second display control, a first content of the second page at a first timepoint; and
        displaying inside of the second display control, a second content of the second page at a second timepoint different than the first timepoint, the second content reflecting an update of the second page at the second timepoint relative to the first timepoint, and wherein the second content of the second page as displayed inside of the second display control includes information of the conversing friend of the user;
    while displaying the second page, detecting a second trigger operation on a page element within the second page; and
    in response to detecting the second trigger operation, switching from displaying the second page to displaying a third page of the same application program according to the page element and displaying the first display control and the second display control at an upper layer of the third page, wherein page content of the first page is synchronously displayed and updated in the first display control upon receiving a latest message from the conversing friend, and page content of the second page is synchronously displayed and updated in the second display control upon receiving the latest message from the conversing friend,
    wherein the first trigger operation includes a sliding gesture occurring outside of the respective display control and sliding to a left edge from a right edge of the display with a sliding distance reaching a predetermined distance.

2. The page switching method according to claim 1, wherein after displaying the second display control at the upper layer of the first page, the page switching method further comprises:
    displaying the second page and displaying the first display control at the upper layer of the second page in response to a selection operation on the second display control.

3. The page switching method according to claim 1, wherein after displaying the first display control at the upper layer of the third page, the page switching method further comprises:
    detecting a third trigger operation on the third page at a location separate from the first display control;
    displaying the second page and creating a third display control in response to the third trigger operation as detected on the third page, the third display control being configured to provide an entry to the third page; and
    displaying the first display control and the third display control at the upper layer of the second page, the third display control being displayed separate from the first display control.

4. The page switching method according to claim 3, further comprising:
    displaying the third display control separate from the first display control; and displaying the second display control and the third display control at the upper layer of the first page in response to detecting a selection operation on the first display control, the second display control being displayed separate from the third display control.

5. The page switching method according to claim 3, further comprising:
displaying the third page and creating the second display control in response to a selection operation on the third display control received when displaying the first display control and the third display control at the upper layer of the second page; and
displaying the first display control and the second display control at the upper layer of the third page.

6. The page switching method according to claim 3, wherein the third trigger operation includes drawing an "M"-shaped pattern on a display screen.

7. The page switching method according to claim 1, further comprising:
moving, in response to a control drag operation on the first display control, the first display control on a display screen according to a track corresponding to the control drag operation.

8. The page switching method according to claim 7, further comprising:
displaying a control cancellation region on the display screen in a process of moving the first display control; and
canceling the displaying of the first display control when an end position of moving the first display control is in the control cancellation region.

9. The page switching method according to claim 8, further comprising:
in response to the process of moving the first display control based on user operation being completed and when the end position is outside the control cancellation region, determining, among edges of a display screen, one edge closest to the end position, and moving the first display control to the one edge of the display screen closest to the end position.

10. The page switching method according to claim 1, further comprising:
adjusting a transparency level of the first display control in the second page or a transparency level of the second display control in the first page.

11. The page switching method according to claim 1, wherein the first page further includes contacts, news, and updates, and the page switching method further comprising:
displaying a target page selection page upon receiving the first trigger operation on the first page, the target page selection page including a candidate page control D1, candidate page control D2, candidate page control D3, and candidate page control D4, a selection of the candidate page control D1 transitioning the first page to the second page, a selection of the candidate page control D1 transitioning the first page to an alternative second page showing the contacts, a selection of the candidate page control D3 transitioning the first page to an alternative second page showing the news, and the selection of the candidate page control D4 transitioning the first page to an alternative second page showing the updates.

12. The page switching method according to claim 1, wherein synchronously displaying the page content of the first page and the page content of the second page comprises:
while displaying the third page, in response to receiving the latest message from the conversing friend, updating, in the first display control, the message list to indicate the latest message and the conversing friend, and updating, in the second display control, the chat record to show the latest message from the conversing friend.

13. A page switching apparatus, comprising: a memory, and a processor coupled to the memory and configured to:
display a first page on a display;
switch the display from displaying the first page to display a second page, create a first display control, and display the first display control at an upper layer of the second page in response to a first trigger operation on the first page, the first display control being configured to provide an entry to the first page, wherein the first page and the second page are two different user interfaces of a same application program, wherein the first page includes a message list for messages between a user and friends, and the second page includes a message window showing a chat record of the user with a conversing friend, and wherein the message list presents a name or a profile picture of the user and a list of the friends of the user including the conversing friend;
switch the display from displaying the second page to display the first page and create a second display control in response to a selection operation on the first display control displayed at the upper layer of the second page, the second display control being configured to provide an entry to the second page;
display the second display control at an upper layer of the first page, wherein the second display control was not previously displayed with the first page, and displaying the second display control further comprises:
displaying inside of the second display control, a first content of the second page at a first timepoint; and
displaying inside of the second display control, a second content of the second page at a second timepoint different than the first timepoint, the second content reflecting an update of the second page at the second timepoint relative to the first timepoint,
wherein the second content of the second page as displayed inside of the second display control includes information of the conversing friend of the user;
while displaying the second page, detect a second trigger operation on a page element within the second page; and
in response to detecting the second trigger operation, switch from displaying the second page to displaying a third page the same application program according to the page element and display the first display control and the second display control at an upper layer of the third page, wherein page content of the first page is synchronously displayed and updated in the first display control upon receiving a latest message from the conversing friend, and page content of the second page is synchronously displayed and updated in the second display control upon receiving the latest message from the conversing friend,
wherein the first trigger operation includes a sliding gesture occurring outside of the respective display control and sliding to a left edge from a right edge of the display with a sliding distance reaching a predetermined distance.

14. The apparatus according to claim 13, wherein the processor is further configured to:

display the second page and display the first display control at the upper layer of the second page in response to a selection operation on the second display control.

15. The apparatus according to claim 13, wherein the processor is further configured to:
   detect a third trigger operation on the third page at a location separate from the first display control;
   display the second page and create a third display control in response to the third trigger operation as detected on the third page, the third display control being configured to provide an entry to the third page; and
   display the first display control and the third display control at the upper layer of the second page, the third display control being displayed separate from the first display control.

16. The apparatus according to claim 15, wherein the processor is further configured to:
   display the third display control separate from the first display control; and
   display the second display control and the third display control at the upper layer of the first page in response to detecting a selection operation on the first display control, the second display control being displayed separate from the third displaying control.

17. The apparatus according to claim 15, wherein the processor is further configured to:
   display the third page and create the second display control in response to a selection operation on the third display control received when displaying the first display control and the third display control at the upper layer of the second page; and
   display the first display control and the second display control at the upper layer of the third page.

18. A non-transitory computer-readable storage medium, storing a computer program, the computer program, when executed by a processor, cause the processor to perform:
   displaying a first page on a display;
   switching the display from displaying the first page to displaying a second page, creating a first display control, and displaying the first display control at an upper layer of the second page in response to a first trigger operation on the first page, the first display control being configured to provide an entry to the first page, wherein the first page and the second page are two different user interfaces of a same application program, wherein the first page includes a message list for messages between a user and friends, and the second page includes a message window showing a chat record of the user with a conversing friend, and wherein the message list presents a name or a profile picture of the user and a list of the friends of the user including the conversing friend;
   switching the display from displaying the second page to displaying the first page and creating a second display control in response to a selection operation on the first display control displayed at the upper layer of the second page, the second display control being configured to provide an entry to the second page;
   displaying the second display control at an upper layer of the first page, wherein the second display control was not previously displayed with the first page, and displaying the second display control further comprises:
      displaying inside of the second display control, a first content of the second page at a first timepoint; and
      displaying inside of the second display control, a second content of the second page at a second timepoint different than the first timepoint, the second content reflecting an update of the second page at the second timepoint relative to the first timepoint, wherein the second content of the second page as displayed inside of the second display control includes information of the conversing friend of the user;
   while displaying the second page, detecting a second trigger operation on a page element within the second page; and
   in response to detecting the second trigger operation, switching from displaying the second page to displaying a third page of the same application program according to the page element and displaying the first display control and the second display control at an upper layer of the third page, wherein page content of the first page is synchronously displayed and updated in the first display control upon receiving a latest message from the conversing friend, and page content of the second page is synchronously displayed and updated in the second display control upon receiving the latest message from the conversing friend,
   wherein the first trigger operation includes a sliding gesture occurring outside of the respective display control and sliding to a left edge from a right edge of the display with a sliding distance reaching a predetermined distance.

* * * * *